United States Patent
O'Neal et al.

(10) Patent No.: US 11,465,903 B2
(45) Date of Patent: Oct. 11, 2022

(54) OXYCOMBUSTION WITH CO$_2$ CAPTURE IN REVERSE FLOW REACTORS

(71) Applicant: ExxonMobil Technology and Engineering Company, Annandale, NJ (US)

(72) Inventors: Everett J. O'Neal, Asbury, NJ (US); Brian M. Weiss, Bridgewater, NJ (US); Anastasios I. Skoulidas, Pittstown, NJ (US)

(73) Assignee: ExxonMobil Technology and Engineering Company, Annandale, NJ (US)

( * ) Notice: Subject to any disclaimer, the term of this patent is extended or adjusted under 35 U.S.C. 154(b) by 301 days.

(21) Appl. No.: 16/838,793

(22) Filed: Apr. 2, 2020

(65) Prior Publication Data

US 2021/0047181 A1 Feb. 18, 2021

Related U.S. Application Data

(60) Provisional application No. 62/829,793, filed on Apr. 5, 2019.

(51) Int. Cl.
*C01B 3/38* (2006.01)
*B01J 8/04* (2006.01)
(Continued)

(52) U.S. Cl.
CPC ............ *C01B 3/384* (2013.01); *B01D 53/047* (2013.01); *B01J 8/0492* (2013.01); *B01J 8/0496* (2013.01);
(Continued)

(58) Field of Classification Search
CPC .. C01B 3/384; C01B 3/40; C01B 3/48; C01B 3/56; C01B 2203/0233; C01B 2203/0283;
(Continued)

(56) References Cited

U.S. PATENT DOCUMENTS

| 4,200,682 A | 4/1980 | Sederquist |
| 4,642,272 A | 2/1987 | Sederquist |

(Continued)

FOREIGN PATENT DOCUMENTS

| GB | 947164 A | 1/1964 |

OTHER PUBLICATIONS

The International Search Report and Written Opinion for PCT/US2020/026424 dated Jul. 2, 2020.

*Primary Examiner* — Jafar F Parsa
(74) *Attorney, Agent, or Firm* — Liza Negron

(57) ABSTRACT

Systems and methods are provided for using oxycombustion to provide heat within a reverse flow reactor environment. The oxygen for the oxycombustion can be provided by oxygen stored in an oxygen storage component in the reactor. By using an oxygen storage component to provide the oxygen for combustion during the regeneration step, heat can be added to a reverse flow reactor while reducing or minimizing addition of diluents and while avoiding the need for an air separation unit. As a result, a regeneration flue gas can be formed that is substantially composed of CO$_2$ and/or H$_2$O without requiring the additional cost of creating a substantially pure oxygen-containing gas flow.

18 Claims, 6 Drawing Sheets

REFORMING STEP

(51) Int. Cl.
- *B01D 53/047* (2006.01)
- *B01J 19/24* (2006.01)
- *B01J 38/40* (2006.01)
- *C01B 3/48* (2006.01)
- *C01B 3/56* (2006.01)
- *B01J 12/00* (2006.01)
- *B01J 23/34* (2006.01)
- *B01J 23/92* (2006.01)
- *B01J 35/04* (2006.01)
- *B01J 38/14* (2006.01)
- *C01B 3/40* (2006.01)

(52) U.S. Cl.
CPC ......... *B01J 12/007* (2013.01); *B01J 19/2465* (2013.01); *B01J 23/34* (2013.01); *B01J 23/92* (2013.01); *B01J 35/04* (2013.01); *B01J 38/14* (2013.01); *B01J 38/40* (2013.01); *C01B 3/40* (2013.01); *C01B 3/48* (2013.01); *C01B 3/56* (2013.01); *B01D 2256/16* (2013.01); *B01D 2257/502* (2013.01); *B01D 2257/504* (2013.01); *B01D 2257/80* (2013.01); *C01B 2203/0233* (2013.01); *C01B 2203/0283* (2013.01); *C01B 2203/042* (2013.01); *C01B 2203/0475* (2013.01); *C01B 2203/0822* (2013.01); *C01B 2203/1094* (2013.01); *C01B 2203/1241* (2013.01)

(58) Field of Classification Search
CPC ...... C01B 2203/042; C01B 2203/0475; C01B 2203/0822; C01B 2203/1094; C01B 2203/1241; C01B 2203/043; C01B 2203/1047; C01B 2203/1076; B01J 8/0492; B01J 8/0496; B01J 12/007; B01J 19/2465; B01J 23/34; B01J 38/14; B01D 53/047; B01D 2256/16; B01D 2257/503; B01D 2257/504

See application file for complete search history.

(56) References Cited

U.S. PATENT DOCUMENTS

| | | |
|---|---|---|
| 5,447,024 A | 9/1995 | Ishida et al. |
| 7,491,250 B2 | 2/2009 | Hershkowitz et al. |
| 7,740,829 B2 | 6/2010 | Becker et al. |
| 7,767,191 B2 | 8/2010 | Thomas et al. |
| 7,815,873 B2 | 10/2010 | Sankaranarayanan et al. |
| 8,754,276 B2 | 6/2014 | Buchanan et al. |
| 2004/0170559 A1 | 9/2004 | Hershkowitz et al. |
| 2012/0111315 A1 | 5/2012 | Grenda et al. |

OXYCOMBUSTION WITH $CO_2$ CAPTURE IN REVERSE FLOW REACTORS

CROSS REFERENCE TO RELATED APPLICATIONS

This application claims priority to U.S. Provisional Application Ser. No. 62/829,793 filed Apr. 5, 2019, which is herein incorporated by reference in its entirety.

FIELD OF THE INVENTION

This invention relates to methods for capture of $CO_2$ generated during operation of reverse flow reactors.

BACKGROUND OF THE INVENTION

Reverse flow reactors are an example of a reactor type that is beneficial for use in processes with cyclic reaction conditions. For example, due to the endothermic nature of reforming reactions, additional heat needs to be introduced on a consistent basis into the reforming reaction environment. Reverse flow reactors can provide an efficient way to introduce heat into the reaction environment. After a portion of the reaction cycle used for reforming or another endothermic reaction, a second portion of the reaction cycle can be used for combustion or another exothermic reaction to add heat to the reaction environment in preparation for the next reforming step. U.S. Pat. Nos. 7,815,873 and 8,754,276 provide examples of using reverse flow reactors to perform various endothermic processes in a cyclic reaction environment.

Some advantages of using reverse flow reactors for endothermic reactions are related to the efficiency of reverse flow reactors during operation at elevated temperatures. During operation, the heat transfer surfaces in a reverse flow reactor are heated by performing combustion within the reactor, and then distributing the heat to the reactor heat transfer surfaces using a working fluid. This direct heating of the heat transfer surfaces allows for efficient heating to relatively high temperatures, such as temperatures of 800° C. or more.

One of the difficulties with performing many types of endothermic reactions is that a substantial amount of $CO_2$ is also produced to provide heat for the endothermic reaction. The heat requirements for such reactions are often increased by the need to perform the endothermic reaction in a high temperature environment to achieve desirable reaction rates. The $CO_2$ generated to provide heat for the reaction environment is in addition to any $CO_2$ generated by the endothermic reaction itself, such as $CO_2$ that is generated as part of hydrocarbon reforming. It would be desirable to have systems and/or methods of operating a reverse flow reactor that can reduce, minimize, and/or mitigate this $CO_2$ production.

In power generation environments, chemical looping reactors provide an alternative to traditional combustion of fuels. U.S. Pat. No. 5,447,024 describes a chemical looping combustion power generation plant system. The system is described as allowing for fuel to be combusted using a metal oxide as the combustion source for oxygen, as opposed to using air as a source of oxygen. Combustion of the fuel converts a portion of the metal oxide to metal. The metal can then be transferred to a second reactor, where the metal is contacted with air to regenerate the metal oxide. The heat release from both the combustion reaction and the regeneration reaction can be recovered, such as in the form of steam.

U.S. Pat. No. 7,767,191 describes another type of chemical looping reactor system. Instead of regenerating the metal using only oxygen, at least a portion of the metal is converted to metal oxide using water. This results in production of $H_2$. The $H_2$ produced during conversion of metal to metal oxide can then be used as fuel for a fuel cell.

SUMMARY OF THE INVENTION

In an aspect, a method for performing an endothermic reaction is provided. The method includes exposing an oxygen-containing stream to an oxygen storage component in a combustion zone within a reactor, such as a reverse flow reactor, to form an oxidized oxygen storage component. The oxygen storage component can include a metal oxide system comprising manganese oxide, iron oxide, copper oxide, nickel oxide, or a combination thereof The oxygen storage component can further include a binder comprising magnesium oxide, calcium oxide, yttrium oxide or a combination thereof. Optionally, the binder can correspond to 20 wt % to 80 wt % of the oxygen storage component, relative to a weight of the oxygen storage component. The method can further include reacting a fuel mixture comprising a fuel stream and a working fluid with the oxidized oxygen storage component under combustion conditions to form a flue gas and to heat one or more surfaces in a reaction zone to a regenerated surface temperature of 600° C. or more. The fuel mixture can include 20 vol % or more $CO_2$. The method can further include recycling at least a portion of the flue gas to form at least a portion of the working fluid. Additionally, the method can include exposing an endothermic reagent stream to the one or more surfaces in the reaction zone at the regenerated surface temperature to form an endothermic product stream, a direction of flow for the endothermic reagent stream within the reaction zone being reversed relative to a direction of flow for the fuel mixture.

One example of an endothermic reagent stream can be $H_2O$. In such an aspect, the endothermic product stream can correspond to $H_2O$ at a higher temperature. As another example, the endothermic reagent stream can correspond to a hydrocarbon, such as methane, and the endothermic product stream can correspond to a reforming effluent.

In another aspect, a reverse flow reactor system is provided. The reverse flow reactor system can include a reactor comprising a reactor inlet end, a regenerator inlet end, and a regeneration zone comprising an oxygen storage component. The oxygen storage component can include a metal oxide system comprising manganese oxide, iron oxide, copper oxide, nickel oxide, or a combination thereof, and a binder comprising magnesium oxide, calcium oxide, yttrium oxide or a combination thereof. Optionally, the binder can correspond to 20 wt % to 80 wt % of the oxygen storage component, relative to a weight of the oxygen storage component. The reactor system can further include a recycle loop providing intermittent fluid communication between the reactor inlet end and the regenerator inlet, the recycle loop comprising a recycle compressor, a fuel source inlet, an oxygen-containing gas inlet, and a $CO_2$-containing gas outlet.

BRIEF DESCRIPTION OF THE DRAWINGS

FIG. 4 shows regeneration gas flow rates and corresponding temperature profile during the reaction cycle for steam reforming in a reverse flow reactor.

FIG. 6 schematically shows an example of operation of a reverse flow reactor.

DETAILED DESCRIPTION OF THE EMBODIMENTS

Figure 1:
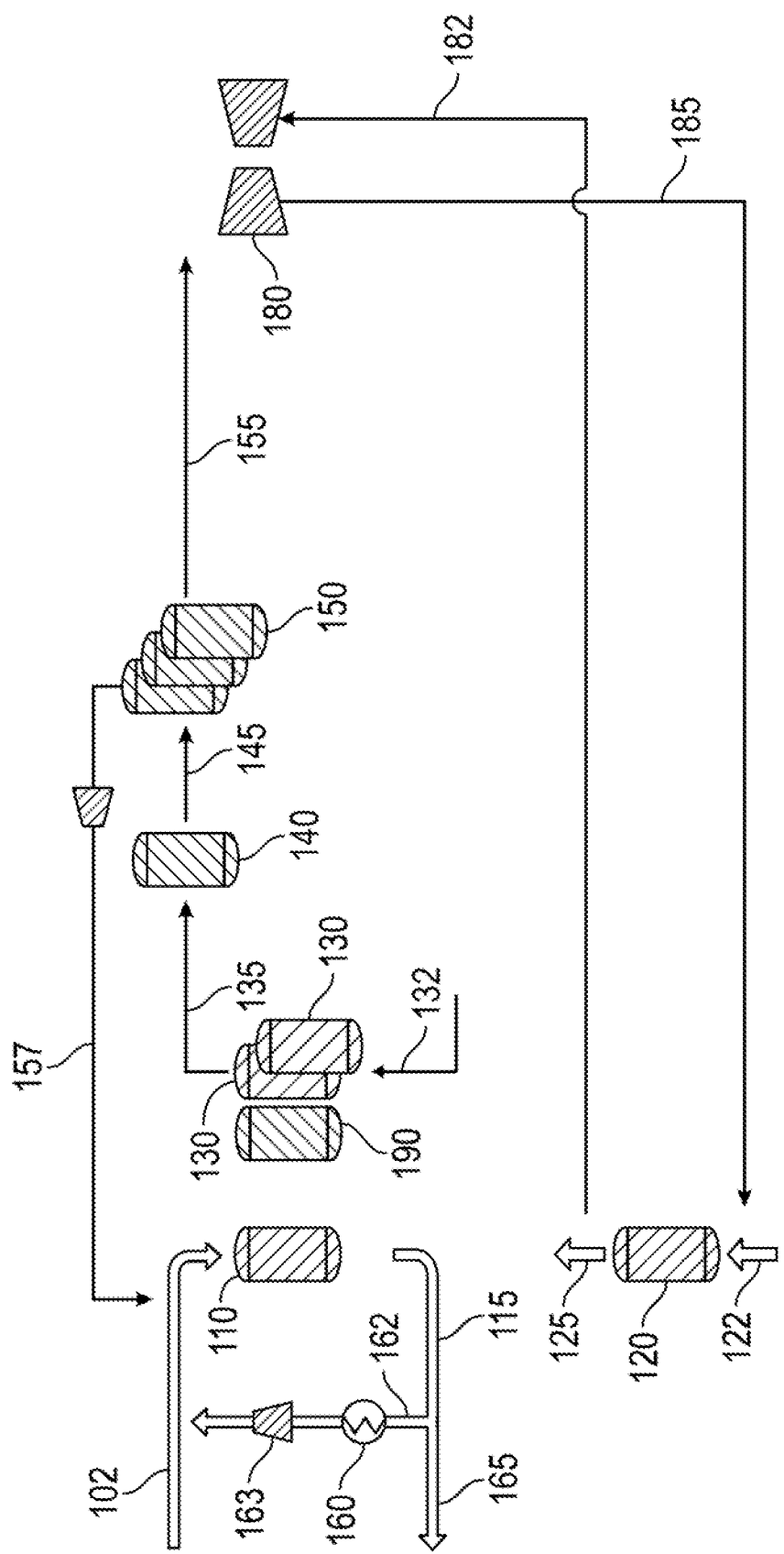
FIG. 1 shows an example of a configuration for using oxycombustion to provide heat for a reverse flow reactor

All numerical values within the detailed description and the claims herein are modified by "about" or "approximately" the indicated value, and take into account experimental error and variations that would be expected by a person having ordinary skill in the art.

Overview

In various aspects, systems and methods are provided for using oxycombustion to provide heat within a reverse flow reactor environment. The oxygen for the oxycombustion can be provided by oxygen stored in an oxygen storage component in the reactor. By using an oxygen storage component to provide the oxygen for combustion during the regeneration step, heat can be added to a reverse flow reactor while reducing or minimizing addition of diluents and while avoiding the need for an air separation unit. As a result, a regeneration flue gas can be formed that is substantially composed of $CO_2$ and/or $H_2O$ without requiring the additional cost of creating a substantially pure oxygen-containing gas flow (such as by using an air separation unit).

In some aspects, reverse flow reactors can provide a suitable reaction environment for performing reactions at elevated temperatures, such as 600° C. or more, or 800° C. or more. It has been unexpectedly discovered that a limited number of oxide systems are suitable for performing oxycombustion in a reverse flow reactor environment. Without being bound by any particular theory, this is believed to be due to limitations regarding both the type of metal oxide that is used as the oxygen storage material as well as any optional binders that are used to stabilize the oxygen storage material in the reaction environment. Based on the nature of the reaction environment in a reverse flow reactor, suitable oxygen storage materials can include manganese oxide, while suitable binder materials can include magnesium oxide, calcium oxide, and yttrium oxide.

During conventional operation of the regeneration step of a reverse flow reactor, a fuel is combusted in the presence of an oxygen-containing stream within a combustion zone. In order to have a sufficient volume of gas to transport heat from the combustion zone to other parts of the reactor, a diluent or working fluid can be included in the reaction environment. Conventionally, the diluent has been provided by using air as the oxygen-containing stream, so that a substantial portion of nitrogen is included in the flue gas. While this provides a convenient method of adding a diluent to the regeneration environment, the flue gas that is produced during regeneration includes a substantial portion of nitrogen. This means that the $CO_2$ in the flue gas is relatively dilute, thus increasing the cost to convert the $CO_2$ in the flue gas into a usable stream and/or into a stream suitable for sequestration.

In various aspects, one or more of the above problems with conventional operation of a reverse flow reactor can be reduced, minimized, or mitigated by using oxycombustion to provide heat during the regeneration step. To provide heat using oxycombustion, one or more surfaces within the reverse flow reactor can include an oxygen storage material, such as manganese oxide with a suitable binder. Prior to performing oxycombustion, a flow of air or another oxygen-containing stream can be passed through the reactor during an oxygen storage step in order to load the oxygen storage material with oxygen. Although this introduces nitrogen into the reverse flow reactor, substantially no $CO_2$ is formed during loading of the oxygen-storage material. Thus, the nitrogen can be exhausted from the reactor in a manner similar to any other stream composed of air. After loading the oxygen storage material, a fuel can then be introduced into the reactor, along with a working fluid for heat transport. Exposing the fuel to the stored oxygen results in combustion. By selecting a working fluid that substantially contains $CO_2$ and/or $H_2O$, the combination of combustion products and working fluid generated during regeneration can correspond to a relatively high purity flue gas of $CO_2$ and $H_2O$. By separating the $H_2O$ from the $CO_2$, a high purity $CO_2$-containing stream can be formed that can be stored and/or used for various applications that involve $CO_2$ as a process input.

Using oxycombustion to provide heat during regeneration can facilitate making other changes to the operation of a reverse flow reactor. For example, $CO_2$ and $H_2O$ are gases with relatively high heat capacities. Using such high heat capacity gases as the working fluid during regeneration can substantially reduce the volume of working fluid that is needed. This can allow the regeneration to be performed at higher pressures, such as pressures of 1000 psig or more, or 2000 psig or more. This can facilitate subsequent recovery and use of the $CO_2$. Still another change can involve using tail gas separated from the reforming product as part of the fuel for regeneration, so that the carbon oxides generated during reforming are also incorporated into the high pressure, $CO_2$-enriched stream.

In some aspects, using oxycombustion to provide heat for a reverse flow reactor can also provide opportunities for integration with other processes that use air as an input flow. For example, gas turbines often need less oxygen than is provide by air. Instead, combustion in the turbine is limited so that excessive heat is not generated at any location. The exhaust flow from the oxygen storage step for a reverse flow reactor corresponds to a partially depleted air flow containing roughly 15 vol % $O_2$, instead of the roughly 21 vol % typically found in air. This partially depleted air flow has sufficient oxygen to be suitable for use as an oxygen-containing gas for a gas turbine combustion environment.

In this discussion, unless otherwise specified, description of temperatures within the reaction zone corresponds to temperatures measured at the location where the maximum temperature occurs in the reaction zone at the end of the regeneration step. The location of the maximum temperature in the reaction zone at the end of the regeneration step is typically at or near the boundary between the reaction zone and the recuperation zone. The boundary between the reaction zone and the recuperation zone is defined as the location where the catalyst for the endothermic reaction begins in the reactor.

In this discussion, unless otherwise specified, all volume ratios correspond to volume ratios where the quantities in the ratio are specified based on volume at standard temperature and pressure (20° C., 100 kPa). This allows volume ratios to be specified consistently even though two flue gas volumes being compared may exist at different temperatures and pressures. When a volume ratio is specified for flue gases being delivered into a reactor, the corresponding flow rate of gas for a unit time under standard conditions can be used for the comparison.

Oxygen Storage in Reverse Flow Reactors

Performing oxycombustion to provide heat during regeneration of a reverse flow reactor generally requires a plurality of reactors. One reactor (or a first plurality of reactors) can correspond to reactors in a regeneration step, where the oxygen storage component (metal oxide) is being used as an oxidant for oxidation (combustion) of a fuel, such as the $H_2$ and CO in an anode exhaust stream. A second reactor (or a second plurality of reactors) can correspond to reactors in an oxygen storage step, where the depleted oxygen storage component (reduced metal oxide) is exposed to oxygen to allow for oxidation/conversion of the oxygen storage component back to the higher oxidation state version of the metal oxide. A third reactor (or a third plurality of reactors) can correspond to a reactor where an endothermic reaction is occurring that uses the heat added to the reactor during the oxycombustion/regeneration step.

The oxygen storage component can be incorporated into the reverse flow reactor in the combustion zone of the reactor. In some aspects, at least a portion of the combustion zone can overlap with the reaction zone, so that the oxygen storage component and the catalyst for the endothermic reaction are present within the same region or portion of the reactor. A working fluid is used to assist with transferring heat generated in the combustion zone to other portions of the reactor, such as any additional portions of the reaction zone that do not include the oxygen storage component.

An oxygen storage component can include a metal oxide system and a binder. The metal oxide system used as the oxygen storage component can correspond to any convenient oxide system that conventionally has oxygen storage capability. The metal oxide system can correspond to any convenient metal oxide that can facilitate oxidation of fuel by reducing the oxidation state of the metal oxide (releasing oxygen), followed by oxidation of the metal oxide to regenerate the initial state of the metal oxide (adding oxygen). Examples of metal oxide systems with oxygen storage capability include, but are not limited to, manganese oxide, iron oxide, copper oxide, and nickel oxide.

In a reverse flow reactor environment, it has been discovered that one of the difficulties with using an oxygen storage component is maintaining the structural stability of the metal oxide system. In order to improve structural stability, the oxygen storage component can further include a binder, such as by formulating the metal oxide system into particles with the binder. A suitable binder can correspond to a binder containing magnesium oxide, calcium oxide, or yttrium oxide. This is in contrast to other refractory binders that can reduce or minimize the ability of a metal oxide system to act as an oxygen storage component. Other refractory binders that reduce or minimize the storage capacity of an oxygen storage component include binders that contain aluminum oxide, silicon oxide, titanium oxide, or zirconium oxide. In aspects where more than one type of oxide is included in a binder, 50 wt % or more of the binder can correspond to magnesium oxide, calcium oxide, or yttrium oxide. The binder can correspond to 20 wt % to 80 wt % of the oxygen storage component, relative to a weight of the oxygen storage component.

Without being bound by any particular theory, it is believed that the combination of elevated temperatures and large swings in temperature that occur in a reverse flow reactor environment can contribute to the difficulties in maintaining structural stability for an oxygen storage component. In particular, the large swings in temperature at elevated temperature can cause the oxide of an oxygen storage component to undergo numerous cycles of thermal expansion and contraction. In order to place the oxygen storage component in the desired combustion zone of the reactor, the oxygen storage component is deposited on one or more surfaces in the reactor (such as one or more surfaces of a monolith). This can cause an oxygen storage component that is deposited on a surface to delaminate or otherwise detach from the surface. The cyclic gas flows passing through the reactor can then push the detached oxygen storage component particles out of the system, or at least out of the desired combustion zone. It is believed that use of a suitable binder can reduce or minimize the amount of thermal expansion and contraction that occurs, thus minimizing or avoiding delamination/detachment of the bound oxygen storage component from surfaces within the reactor.

It is noted that conventionally a broader class of materials can be used as an oxygen storage component. For example, in a chemical looping reactor environment, is known to be effective as oxygen storage components. However, in a reverse flow reactor operating environment, it has been discovered that tin oxide (with or without binder) can serve as an oxygen storage component for only an initial period of cycles. After a few days of performing oxycombustion cycles, the tin oxide volatilizes, thus preventing further use as an oxygen storage component.

An oxygen storage component can exist in at least two oxidation states. One oxidation state can correspond to an oxidized state where additional oxygen is present, while the second oxidation state can correspond to a reduced state. The reduced state can be converted to the oxidized state by exposing the metal oxide to $O_2$ (such as $O_2$ from air) under oxygen storage conditions, such as conditions including an oxygen storage temperature and an oxygen storage pressure. The oxidized state can then be converted to the reduced state by, for example, exposing a fuel to the oxygen storage component under oxycombustion conditions. The oxygen storage temperature can be roughly 400° C.-1200° C., or 400° C. to 800° C. A variety of pressures can be suitable for the oxygen storage pressure. Generally, any convenient pressure from 0.1 MPa-a to 30 MPa-a can be used for oxygen storage. In some aspects, the oxygen storage pressure can differ from the pressure during the regeneration step by 5.0 MPa or less, or 3.0 MPa or less. In some aspects the oxygen storage pressure can be 5.0 MPa-a to 30 MPa-a, or 5.0 MPa-a to 22 MPa-a, or 5.0 MPa-a to 16 MPa-a, or 10 MPa-a to 30 MPa-a, or 10 MPa-a to 22 MPa-a, or 10 MPa-a to 16 MPa-a.

Typically, the oxygen storage step is performed prior to performing the regeneration step. Due to the combustion performed during regeneration, the amount of available oxygen for reaction in the oxygen storage component can be reduced or minimized after regeneration. This can reduce or minimize the amount of interaction between storage oxygen in the oxygen storage component and reagents in the endothermic reaction step. For example, when the endothermic reaction step corresponds to hydrocarbon reforming, the hydrocarbons for reforming are susceptible to combusting if available oxygen is present in the oxygen storage component.

In some aspects, there is a reduced concern of interaction between stored oxygen and the reagents for the endothermic reaction. For example, when the endothermic reaction corresponds to steam generation, the steam is not susceptible to combustion. In such aspects, a supplemental oxygen storage step can be used to further modify the temperature profile in the reactor prior to the endothermic reaction.

Addition of oxygen to the oxygen storage component during an oxygen storage step corresponds to an exothermic reaction. Thus, heat is generated during an oxygen storage step. This means that by including oxygen storage component near the end of the reactor, additional heat can be added to the end of the reactor without having to use excessive amounts of working fluid to transfer heat from the combustion zone (typically near the middle of the reactor) to the end of the reactor. This can allow a flatter temperature profile to be created prior to the endothermic reaction step.

Figure 3:
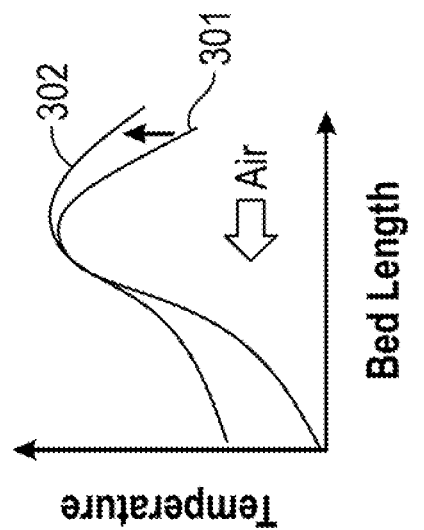
FIG. 3 shows temperature profiles within a reactor at various stages within a reaction cycle when operating with a supplemental oxygen storage step.

As an example, after a regeneration step, the temperature profile within a reactor can have a peak near the middle. Such a temperature profile is shown by curve 301 in FIG. 3. Due to this profile, the temperature near the end of the reactor where reagents will be introduced for the endothermic reaction can be lower than the temperature near the middle of the reactor. It is noted that the direction of flow during the endothermic reaction is typically the opposite from the direction of flow during regeneration. This temperature profile can be modified by including some oxygen storage component near the end of the reactor where the reactants for the endothermic reaction will be introduced. After regeneration, an oxygen-containing stream can be introduced in the opposite flow direction from the regeneration flow, so that the oxygen-containing stream is introduced at the same end where the reagents for the endothermic reaction will be introduced. This can allow the oxygen storage component near the end of the reactor to add oxygen, which is an exothermic reaction. This can increase the temperature of the reactor near the end of the reactor, as shown by curve 302. Thus, the temperature profile for the reaction zone where the endothermic reaction will take place can be modified without having to substantially increase the temperature near the middle of the reactor and/or without having to substantially increase the amount of working fluid passed through the reactor during regeneration.

Oxycombustion for Regeneration of Reverse Flow Reactor

Reverse flow reactors and/or other reactors with flows in opposite directions at different stages of a reaction cycle can be useful when performing endothermic reactions at elevated temperatures, such as temperatures of 600° C. or more, or 800° C. or more. Conventionally, a reverse flow reactor (or other reactor with flows in opposite directions) can have a regeneration or combustion flow (including fuel, oxygen, and working fluid) that is used to heat one or more surfaces a reaction zone within the reactor to a desired temperature. The reagents for a desired endothermic reaction can then be passed in using a flow in the opposite direction. The heat stored within the reactor during the regeneration step is used to provide heat for the desired endothermic reaction.

One of the challenges in operating a reverse flow reactor is managing the introduction of heat during the regeneration step. Introducing a larger amount of heat into the reactor during the regeneration step can allow for an increased amount of the corresponding endothermic reaction during the reaction step. However, the amount of heat that can be introduced is constrained by the need to avoid excessive temperature spikes in localized areas. For example, performing too much combustion at a single location could result in exceeding a maximum temperature for the structural materials and/or internal components of the reactor.

In order to overcome this difficulty, a working fluid can be introduced during the regeneration step as part of the fuel mixture. The reactor can also be pressurized during regeneration to increase the amount of working fluid per unit volume. The working fluid absorbs a portion of the heat generated during combustion and carries the heat to downstream locations within the reactor (relative to the direction of flow in the regeneration step). This can allow additional heat to be introduced into the reactor while reducing the maximum temperature at any location. Thus, the input flows during regeneration of a reverse flow reactor can correspond to a to combination of fuel, an oxygen-containing stream, and a working fluid. In various aspects, one or more of the fuel, the oxygen-containing stream, and the working fluid can be modified to allow for production of a high pressure $CO_2$-containing gas.

When oxycombustion is used to provide heat in a reverse flow reactor, an additional independent flow potentially becomes available for use in transferring heat between surfaces within the reactor. During conventional operation, the combustion or regeneration flow is a flow that includes all of the components that are needed for combustion. This includes a fuel, an oxygen-containing stream, and a working fluid for transporting heat from the combustion zone to other surfaces within the reactor. By contrast, when oxycombustion is used to provide heat during regeneration, the introduction of oxygen into the reactor is provided using a separate flow from the introduction of fuel and working fluid. During introduction of oxygen into the reactor, the oxygen storage component is exposed to an oxygen-containing flow. This causes the manganese oxide to add oxygen that can subsequently be used for combustion. This consumes some oxygen from the oxygen-containing flow, but does not otherwise substantially alter the composition of the oxygen-containing flow. For example, if air is used as the oxygen-containing flow, the output flow from the oxygen introduction step is air with a modestly lower content of $O_2$. After completing the oxygen introduction step, the fuel and working fluid can be passed into the reactor. The fuel reacts with the stored oxygen to generate heat that the working fluid can distribute within the reactor.

Because the oxygen introduction step produces an exhaust stream that is similar to air, the exhaust from the oxygen introduction step can be handled in any convenient manner. This can provide flexibility when performing the oxygen introduction step, so long as sufficient oxygen is added to the oxygen storage component to perform the combustion reaction. For example, depending on the desired temperature profile, the oxygen introduction step can be performed with a flow that is in the same direction as the fuel and working fluid flow, or in the same direction as the flow for the subsequent endothermic reaction. Additionally, the conditions for passing the oxygen-containing flow through the reactor can be modified to allow for greater or lesser amounts of heat transport during the oxygen introduction step. The amount of oxygen that is consumed from the oxygen-containing flow by the oxygen storage component can vary, but it is typically around 20% to 30% of the oxygen present in the oxygen-containing flow. For example, the oxygen content of air can be reduced from roughly 20 vol % (relative to the total volume of air) down to roughly 15 vol %, corresponding to consuming roughly 25% of the oxygen present in the air. If desired, the space velocity of the oxygen-containing flow can be varied so that a greater or lesser volume of air is passed through the reactor during the oxygen introduction step. By changing the space velocity, the volume of fluid passing through the reactor during oxygen introduction, which can allow for greater or lesser amounts of heat transfer within the reactor. It is noted that such changes in space velocity can also change the amount of oxygen consumed, as higher space velocities can lead to exposure of the oxygen storage component to a greater volume of oxygen, but with a lower percentage of the oxygen being stored by the oxygen storage component.

Another advantage of having separate flows for oxygen introduction and combustion during oxycombustion is that the choice of oxygen-containing stream does not impact the composition of the working fluid. Conventionally, a substantial portion of the working fluid used in a reverse flow reactor regeneration step corresponds to nitrogen, which is a relatively low heat capacity gas. Such a working fluid can be formed by using recycled flue gas as the working fluid while also using air as the oxygen source for combustion. In such a configuration, nitrogen can correspond to 50 vol % or more of the flow into a reactor during the regeneration step, and the volume of nitrogen can potentially be as much as an order of magnitude greater (or more) than the amount fuel that is introduced to generate heat (volume basis). This large volume of working fluid can result in substantial pressure drops within a reactor, leading to substantial operating costs for compression. Larger reactor sizes could mitigate the pressure drops, but such increases in reactor size can create other processing difficulties. Additionally, increasing reactor footprint within a refinery is typically a less desirable outcome.

By using oxycombustion instead of conventional combustion to provide heat for regeneration, the air flow (oxygen-containing stream) can be passed into the reactor at a different time from the fuel and working fluid. Thus, a working fluid other than nitrogen can be used without also requiring the use of an air separation unit to provide an oxygen-containing stream with reduced or minimized nitrogen. In various aspects, the working fluid can correspond to recycled flue gas containing $CO_2$, $H_2O$, or a combination thereof.

In such aspects, the working fluid can include 20 vol % or more $CO_2$, or 25 vol % or more, or 30 vol % or more, or 40 vol % or more, such as up to 100 vol %. In some aspects, the working fluid can include 20 vol % to 60 vol % $CO_2$, or 25 vol % to 60 vol %, or 30 vol % to 60 vol %, or 20 vol % to 50 vol %, or 25 vol % to 70 vol %. Optionally, the working fluid can include 10 vol % or more of $H_2O$, or 20 vol % or more, or 40 vol % or more, such as up to 70 vol % or possibly still higher. In some aspects, the working fluid can include 95 vol % to 100 vol % of $CO_2$ and $H_2O$, or 98 vol % to 100 vol %. It is noted that if the working fluid corresponded entirely to the combustion products formed from stoichiometric combustion of methane, the working fluid would have a composition of roughly 33 vol % $CO_2$ and 67 vol % $H_2O$. Depending on the aspect, the working fluid can contain 15 vol % or less of $N_2$, or 10 vol % or less, or 5.0 vol % or less, or 2.0 vol % or less, such as down to having substantially no $N_2$ content (0.1 vol % or less).

In some aspects, the fuel for the regeneration step can correspond to a conventional hydrocarbon fuel, such as methane or natural gas. In other aspects, the fuel can correspond to a mixture of a hydrocarbon fuel (such as methane) and a recycled tail gas from separation of the reforming effluent. When a recycled tail gas is included as part of the fuel, the resulting fuel mixture (fuel plus working fluid plus oxygen-containing gas) can include 2.0 vol % or more of CO, or 5.0 vol % or more, or 8.0 vol % or more, such as up to 15 vol % or possibly still higher. A tail gas for recycle can be formed, for example, by separating hydrogen from the reforming effluent using a swing adsorber.

Reducing or minimizing the nitrogen content of the input flows to the regenerator can facilitate performing regeneration at a substantially higher pressure. Conventionally, regeneration in a reverse flow reactor is performed at a pressure similar to the desired pressure for performing the corresponding endothermic reaction. When a reverse flow reactor is used for reforming, this can correspond to performing the regeneration at a pressure between 0.5 MPa-a and 3.0 MPa-a. With a conventional recycled flue gas containing substantial amounts of $N_2$, operating the regeneration at higher pressures would require an undesirable increase in compression costs. This is due to the large volumes of $N_2$ that are needed to compensate for the low heat capacity of $N_2$.

In various aspects, use of an oxygen storage component can reduce, minimize, or even eliminate the presence of $N_2$ within the flue gas that is recycled for regeneration. This can allow for flexibility in selecting the pressure during regeneration. In some aspects, the regeneration can be performed using combustion conditions at a pressure similar to the pressure for the corresponding endothermic reaction, such as a pressure of 0.5 MPa-a to 7.0 MPa-a. In other aspects the regeneration step can be performed at higher pressure combustion conditions, such as a pressure of 0.5 MPa-a to 15 MPa-a, or 7.5 MPa-a to 15 MPa-a. Such higher pressures can be beneficial, for example, if it is desired to subsequently sequester or otherwise use any $CO_2$ generated during combustion. The temperature at the start of oxycombustion can vary depending on the nature of the endothermic reaction. Depending on the aspect, the temperature at the start of oxycombustion can be 400° C. to 800° C. The peak temperature within the reactor during and/or after oxycombustion can also vary. The peak temperature within the reactor during and/or after oxycombustion can be 800° C. to 1400° C., or 800° C. to 1200° C.

Operating the regenerator at high pressure can provide several advantages. First, high pressure operation can facilitate heat transfer within the reverse flow reactor, resulting in a more evenly distributed heat profile after regeneration. Second, by forming a high pressure flue gas that contains primarily $CO_2$ and $H_2O$, a portion of the flue gas can be used as a $CO_2$ stream for sequestration or other uses after minimal additional processing.

After passing through the reactor, the flue gas from the regenerator can be compressed to return the flue gas to the pressure for use as a working fluid for regeneration. Before or after compression, a portion of the flue gas can be separated out as a $CO_2$-containing product stream. The water in the $CO_2$-containing product stream can be removed by cooling the $CO_2$-containing product stream, such as by heat exchange. In continuous flow operation, this can be performed while roughly maintaining the pressure of the $CO_2$-containing stream. This can result in a $CO_2$-containing stream with a $CO_2$ content of 80 vol % or more, or 90 vol % or more, or 95 vol % or more, such as up to containing substantially only $CO_2$ (less than 0.1 vol % of other components, or 99.9% or more $CO_2$). The $CO_2$-containing stream can then be passed into a sequestration process. Alternatively, the $CO_2$-containing stream can be used as an input for a process that uses $CO_2$, such as dry ice production or injection into a hydrocarbon extraction site. Generally, sequestration and/or use of $CO_2$ is performed at a pressure of roughly 20 MPa-a or more. Thus, operating the regeneration step of the reverse flow reactor at an elevated pressure can allow the heat transfer benefits of high pressure operation to be realized while also producing a $CO_2$-containing stream that is at a desirable pressure for further use.

In addition to the above advantages, it has been discovered that using a higher heat capacity gas as the diluent during the regeneration step can provide an unexpected decrease in the laminar flame speed of the combustion reaction at temperatures of 600° C. or more. A higher laminar flame speed corresponds to faster combustion. Decreasing the laminar flame speed of the combustion reaction during the regeneration step can expand the distance within the reactor where the combustion reaction occurs. This spreading out of the combustion region can provide a further unexpected reduction in maximum temperature when combustion is performed at temperatures of 600° C. or more, or 700° or more, or 800° C. or more, such as up to 1500° C. or possibly still higher. In some aspects, addition of a high heat capacity gas to the diluent can reduce the laminar flame speed at temperature of 600° C. or more, or 700° C. or more, or 800° C. or more, to 100 cm/s or less, or 75 cm/s or less. It is noted that the decrease in laminar flame speed may be due in part to improved radical quenching by the higher heat capacity gas.

Example of Reverse Flow Reactor Configuration

For endothermic reactions operated at elevated temperatures, such as hydrocarbon reforming, a reverse flow reactor can provide a suitable reaction environment for providing the heat for the endothermic reaction.

In a reverse flow reactor, the heat needed for an endothermic reaction may be provided by creating a high-temperature heat bubble in the middle of the reactor. A three-step process can then be used wherein (a) oxygen is stored within an oxygen storage component in the reactor, (b) heat is added to the reactor bed(s) or monolith(s) via in-situ combustion of a fuel with the oxygen stored in the oxygen storage component, and then (c) the heat is removed from the bed in-situ via an endothermic process, such as reforming, pyrolysis, steam generation, or steam cracking. This type of configuration can provide the ability to consistently manage and confine the high temperature bubble in a reactor region(s) that can tolerate such conditions long term. A reverse flow reactor system can allow the primary endothermic and regeneration processes to be performed in a substantially continuous manner. In aspects where heat is added to the reactor via oxycombustion, the oxygen storage component in the reactor can be located in the reaction zone for combustion.

As an example, a reverse flow reactor system can include first and second reactors, oriented in a series relationship with each other with respect to a common flow path, and optionally but preferably along a common axis. The common axis may be horizontal, vertical, or otherwise. In other examples, a reverse flow reactor system can correspond to a single reactor that includes both a reaction zone and a recuperation zone.

The first step of the three-step sequence can be an oxygen storage step. During an oxygen storage step, an oxygen-containing gas (such as air) can be passed into the reactor to allow the oxygen storage component to uptake oxygen. This can prepare the oxygen storage component for the regeneration step.

During a regeneration step, a mixture of fuel and a working fluid is exposed to the oxygen storage component in the combustion zone to combust therein, in-situ, and create a high temperature zone or heat bubble inside a middle portion of the reactor system. The heat bubble can correspond to a temperature that is at least about the initial temperature for the endothermic reaction. Typically, the temperature of the heat bubble can be greater than the initial temperature for the endothermic reaction, as the temperature will decrease as heat is transferred from the heat bubble in a middle portion of the reactor toward the ends of the reactor. The combustion process can take place over a long enough duration that the flow of working fluid through the first reactor also serves to displace a substantial portion, (as desired) of the heat produced by the reaction (e.g., the heat bubble), into and at least partially through the second reactor, but preferably not all of the way through the second reactor to avoid waste of heat and overheating the second reactor. This heat is transferred, for example, to one or more surfaces in the second reactor and/or in the reaction zone for the endothermic reaction in a reactor. The flue gas may be exhausted through the second reactor, but preferably most of the heat is retained within the second reactor. The amount of heat displaced into the second reactor during the regeneration step can also be limited or determined by the desired exposure time or space velocity that the hydrocarbon feed gas will have in the endothermic reaction environment. In aspects where a single reactor is used, the heat produced by the reaction can be displaced into and/or at least partially through the reaction zone of the reactor, but preferably the displacement can also reduce or minimize waste of heat due to exit of heated gas from the reactor.

After regeneration or heating the second reactor media (which can include and/or correspond to one or more surfaces including a catalyst for an endothermic reaction), in the next/reverse step or cycle, reactants for the endothermic reaction can be supplied or flowed through the second reactor, from the direction opposite the direction of flow during the heating step. For example, in a reforming process, methane (and/or natural gas and/or another hydrocarbon) can be supplied or flowed through the second reactor. The methane can contact the hot second reactor and mixer media, in the heat bubble region, to transfer the heat to the methane for reaction energy.

Figure 6A:
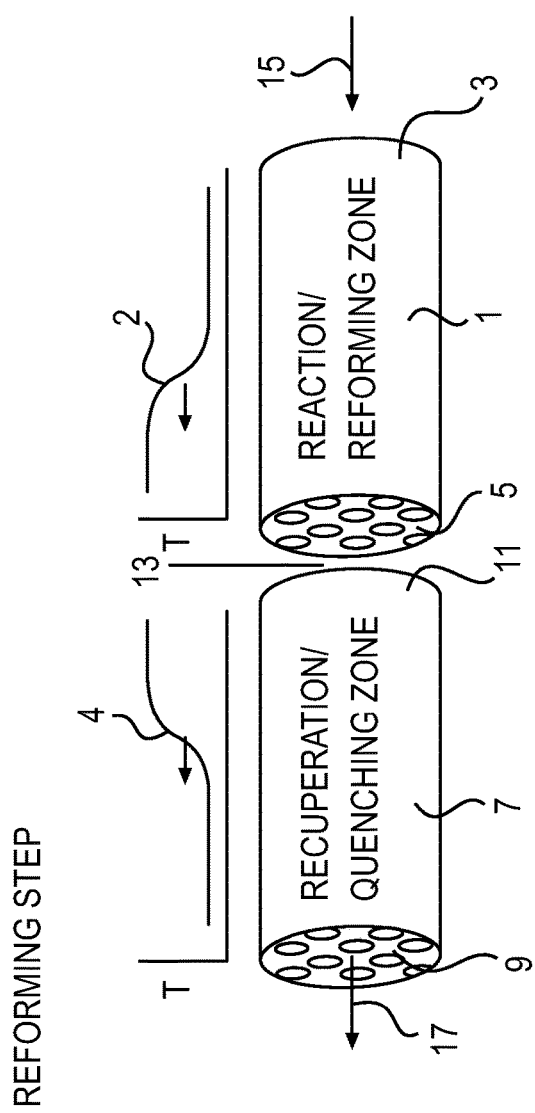
FIG. 6A shows the reforming step of a reforming reaction.
Figure 6B:
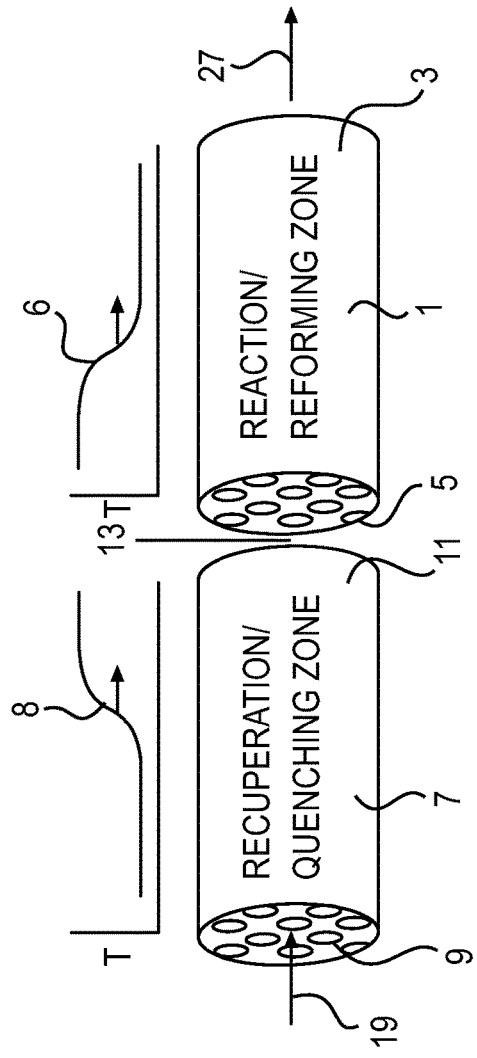
FIG. 6B shows a regeneration step of a reforming reaction.

For some aspects, the regeneration step and endothermic reaction step of the asymmetric cycle of a reverse flow regenerative bed reactor system is depicted in FIGS. 6A and 6B of FIG. 6 in terms of a reactor system having two zones/reactors; a first or recuperator/quenching zone (7) and a second or reaction zone (1). Both the reaction zone (1) and the recuperator zone (7) can contain regenerative monoliths and/or other regenerative structures formed from a doped ceramic composition. Regenerative monoliths or other regenerative structures, as used herein, comprise materials that are effective in storing and transferring heat as well as being effective for carrying out a chemical reaction. Additionally, in order to facilitate oxycombustion, the regenerative monoliths or regenerative structures can include an oxygen storage component as a washcoat, as bound catalyst deposited on the structure, or in another convenient manner. The regenerative monoliths and/or other structures can correspond to any convenient type of material that is suitable for storing heat, transferring heat, and catalyzing a reaction. Examples of structures can include bedding or packing material ceramic beads or spheres, ceramic honeycomb materials, ceramic tubes, extruded monoliths, and the like, provided they are competent to maintain integrity, functionality, and withstand long term exposure to temperatures in excess of 1200° C., or in excess of 1400° C., or in excess of 1600° C., which can allow for some operating margin. In some aspects, the catalytic ceramic monolith and/or other catalytic ceramic structure can be used without the presence of an additional washcoat.

The basic cycle shown in FIG. 6 corresponds to the portions of the cycle where fuel is combusted (FIG. 6A) and where the endothermic reaction is performed (FIG. 6B). In contrast to conventional operation, using oxycombustion to provide heat adds a third step to the basic cycle, corresponding to a step for storing oxygen in the oxygen storage component. This oxygen storage step occurs between the steps shown in FIG. 6A and FIG. 6B, so that oxygen is present for combustion when fuel is introduced. The flow direction for the oxygen storage step can be either direction. The selection of the flow direction can be dependent, for example, on any additional heat transfer that is desired to be performed during the oxygen storage step.

To facilitate description of FIG. 6, the reactor is described herein with reference to a reforming reaction. As shown in FIG. 6A of FIG. 6, at the beginning of the "reaction" step of the cycle, a secondary end 5 of the reaction zone 1 (a.k.a. herein as the second reactor) can be at an elevated temperature as compared to the primary end 3 of the reaction zone 1, and at least a portion (including the first end 9) of the recuperator or quench zone 7 (a.k.a. herein as the first reactor), can be at a lower temperature than the reaction zone 1 to provide a quenching effect for the resulting product. In an aspect where the reactors are used to perform reverse flow reforming, a methane-containing reactant feed (or other hydrocarbon-containing reactant feed) can be introduced via a conduit(s) 15, into a primary end 3 of the reforming or reaction zone 1. In various aspects, the hydrocarbon-containing reactant feed can also contain $H_2O$, $CO_2$, or a combination thereof.

The feed stream from inlet(s) 15 can absorb heat from reaction zone 1 and endothermically react to produce the desired synthesis gas product. As this step proceeds, a shift in the temperature profile 2, as indicated by the arrow, can be created based on the heat transfer properties of the system. When the ceramic catalyst monolith/other catalyst structure is designed with adequate heat transfer capability, this profile can have a relatively sharp temperature gradient, which gradient can move across the reaction zone 1 as the reforming step proceeds. In some aspects, a sharper temperature gradient profile can provide for improved control over reaction conditions. In aspects where another type of endothermic process is performed, a similar shift in temperature profile can occur, so that a temperature gradient moves across reaction zone 1 as the reaction step proceeds.

The effluent from the reforming reaction, which can include unreacted feed components (hydrocarbons, $H_2O$, $CO_2$) as well as synthesis gas components, can exit the reaction zone 1 through a secondary end 5 at an elevated temperature and pass through the recuperator reactor 7, entering through a second end 11, and exiting at a first end 9. The recuperator 7 can initially be at a lower temperature than the reaction zone 1. As the products (and optionally unreacted feed) from the reforming reaction pass through the recuperator zone 7, the gas can be quenched or cooled to a temperature approaching the temperature of the recuperator zone substantially at the first end 9, which in some embodiments can be approximately the same temperature as the oxygen-containing stream and/or the regeneration feed introduced during the second step and third step of the cycle. As the reforming effluent is cooled in the recuperator zone 7, a temperature gradient 4 can be created in the zone's regenerative bed(s) and can move across the recuperator zone 7 during this step. The quenching can heat the recuperator 7, which can be cooled again in the second step to later provide another quenching service and to prevent the size and location of the heat bubble from growing progressively through the quench reactor 7. After quenching, the reaction gas can exit the recuperator at 9 via conduit 17 and can be processed for separation and recovery of the various components.

The second step of the cycle, referred to as the oxygen storage step, can then begin with introduction of an oxygen-containing stream, such as air, via conduit(s) 15, conduit(s) 19, or in another convenient manner. In the example configuration shown in FIG. 6, the oxygen storage component can be located in a region proximate to interface 13. This will cause the combustion reaction to occur in the region proximate to interface 13, since the combustion reaction will not occur until the fuel arrives at the same location where oxygen from the oxygen storage component is available. The direction of flow for the oxygen-containing stream can be selected based on a desired change in the temperature profile, if desired. For example, the oxidation of the metal oxide in the oxygen storage component represents an exothermic process, so a small amount of additional heat will become available during the oxygen storage step. If it is desired to preferentially add heat to the temperature profile in a direction, the oxygen-containing stream can be introduced so that the stream carries heat from the oxidation in the desired direction. As another option, the oxygen-containing stream could be introduced in the same direction as the reforming flow, in order to further carry heat from the reaction zone toward the combustion zone prior to performing combustion.

The third step of the cycle, referred to as the regeneration step, can then begin with reintroduction of fuel and working fluid via conduit(s) 19. The fuel and working fluid can pass through hot recuperator 7 toward the second end 11 of the recuperator 7.

An example of the regeneration step is illustrated in FIG. 6B of FIG. 6. Regeneration can entail transferring recovered sensible heat from the recuperator zone 7 to the reaction zone 1 to thermally regenerate the reaction beds 1 for the subsequent reaction cycle. Fuel and working fluid can enter recuperator zone 7, such as via conduit(s) 19, and flow through the recuperator zone 7 and into the reaction zone 1. In doing so, the temperature gradients 6 and 8 may move across the beds as illustrated by the arrows on the exemplary graphs in FIG. 6B, similar to but in opposite directions to the graphs of the temperature gradients developed during the reaction cycle in FIG. 6A of FIG. 6. Fuel and oxygen from the oxygen storage component may combust at a region proximate to the interface 13 of the recuperator zone 7 and the reaction zone 1. The heat recovered from the recuperator zone together with the heat of combustion can be transferred to the reaction zone (via movement of the working fluid), thermally regenerating the regenerative reaction monoliths and/or beds 1 disposed therein.

It is noted that using an oxygen storage component as the oxygen source avoids at least some of the difficulties in selecting the region of the reverse flow reactor where combustion occurs. Conventionally, at least a portion of the fuel and oxygen are separated in separate flow channels until the fuel and oxygen reach a location at or near the desired combustion zone. By contrast, using an oxygen storage component allows the oxygen to be stored at or near the desired combustion zone, so that fuel and oxygen are exposed to each other at the desired location simply by flowing the fuel through the reactor.

Although the first and second reactors in the reactor system are identified as separately distinguishable reactors, it is understood that the first and second reactors may be manufactured, provided, or otherwise combined into a common single reactor bed, whereby the reactor system might be described as comprising merely a single reactor that integrates both cycles within the reactor. The terms "first reactor" and "second reactor" can merely refer to the respective zones within the reactor system whereby each of the regeneration, reformation, quenching, etc., steps take place and do not require that separate components be utilized for the two reactors.

In some aspects, the recuperator can be comprised of one or more extruded honeycomb monoliths, as described above. Each monolith may provide flow channel(s) (e.g., flow paths) for fuel and working fluid. In such an aspect, the oxygen storage component can be applied to at least part of the monolith as a washcoat. This can increase the available surface area of oxygen storage component relative to the total volume that the fuel is passing through. In other aspects, the oxygen storage component can correspond to formulated particles of manganese oxide bound with a suitable binder. Such particles can be deposited on a monolith and/or deposited on any convenient surfaces within the desired combustion zone of the reactor.

In aspects where a monolith is used, the monolith can have any convenient shape suitable for use as a catalytic surface. An example of a monolith can be an extruded honeycomb monolith. Honeycomb monoliths can be extruded structures that comprise many (e.g., a plurality, meaning more than one) small gas flow passages or conduits, arranged in parallel fashion with thin walls in between. A small reactor may include a single monolith, while a larger reactor can include a number of monoliths, while a still larger reactor may be substantially filled with an arrangement of many honeycomb monoliths. Each monolith may be formed by extruding monolith blocks with shaped (e.g., square or hexagonal) cross-section and two- or three-dimensionally stacking such blocks above, behind, and beside each other. Monoliths can be attractive as reactor internal structures because they provide high heat transfer capacity with minimum pressure drop.

In some aspects, honeycomb monoliths can be characterized as having open frontal area (or geometric void volume) between 25% and 55%, and having conduit density between 50 and 2000 pores or cells per square inch (CPSI), or between 100 and 900 cells per square inch, or between 100 cells per square inch to 600 cells per square inch. For example, in one embodiment, the conduits may have a diameter/characteristic cell side length of only a few millimeters, such as on the order of roughly one millimeter. Reactor media components, such as the monoliths or alternative bed media, can provide for channels that include a packing with an average wetted surface area per unit volume that ranges from 50 $ft^{-1}$ to 3000 $ft^{-1}$ (~0.16 $km^{-1}$ to ~10 $km^{-1}$), or from 100 $ft^{-1}$ to 2500 $ft^{-1}$ (~0.32 $km^{-1}$ to ~8.2 $km^{-1}$), or from 200 $ft^{-1}$ to 2000 $ft^{-1}$ (~0.65 $km^{-1}$ to ~6.5 $km^{-1}$), based upon the volume of the first reactor that is used to convey a reactant. These relatively high surface area per unit volume values can aid in achieving a relatively quick change in the temperature through the reactor, such as generally illustrated by the relatively steep slopes in the exemplary temperature gradient profile graphs shown in FIG. 6.

Reactor media components can also provide for channels that include a packing that includes a high volumetric heat transfer coefficient (e.g., 0.02 cal/$cm^3$s° C. or more, or 0.05 cal/$cm^3$s° C. or more, or 0.10 cal/cal/$cm^3$s° C. or more); that have low resistance to flow (low pressure drop); that have an operating temperature range consistent with the highest temperatures encountered during regeneration; that have high resistance to thermal shock; and/or that have high bulk heat capacity (e.g., 0.10 cal/$cm^3$s° C. or more, or 0.20 cal/$cm^3$s° C. or more). As with the high surface area values, these relatively high volumetric heat transfer coefficient values and/or other properties can aid in achieving a relatively quick change in the temperature through the reactor, such as generally illustrated by the relatively steep slopes in the exemplary temperature gradient profile graphs, such as in FIGS. 6A and 6B of FIG. 6. The cited values are averages based upon the volume of reactor used for conveyance of a reactant.

In various aspects, adequate heat transfer rate can be characterized by a heat transfer parameter, $\Delta THT$, below 500° C., or below 100° C., or below 50° C. The parameter $\Delta THT$, as used herein, is the ratio of the bed-average volumetric heat transfer rate that is needed for recuperation, to the volumetric heat transfer coefficient of the bed, hv. The volumetric heat transfer rate (e.g. cal/$cm^3$ sec) that is sufficient for recuperation can be calculated as the product of the gas flow rate (e.g. g/sec) with the gas heat capacity (e.g. cal /g° C.) and desired end-to-end temperature change (excluding any reaction, e.g. ° C.), and then this quantity can be divided by the volume (e.g. $cm^3$) of the reactor (or portion of a reactor) traversed by the gas. The volumetric heat transfer coefficient of the bed, hv, can typically be calculated as the product of an area-based coefficient (e.g. cal/$cm^2$s° C.) and a specific surface area for heat transfer (av, e.g. $cm^2$/$cm^3$), often referred to as the wetted area of the packing.

In some aspects, a washcoat can be added to the formed, sintered ceramic composition. A washcoat can allow the sintered ceramic composition to be impregnated with additional catalytic metal.

One option for incorporating an additional catalytic metal into a washcoat can be to impregnate a catalyst support with the additional catalytic metal, such as by impregnation via incipient wetness. The impregnation can be performed with an aqueous solution of suitable metal salt or other catalytic metal precursor, such as tetramineplatinum nitrate or rhodium nitrate hydrate. The impregnated support can then be dried and/or calcined for decomposition of the catalytic metal precursor. A variety of temperature profiles can potentially be used for the heating steps. One or more initial drying steps can be used for drying the support, such as heating at a temperature from 100° C. to 200° C. for 0.5 hours to 24 hours. A calcination to decompose the catalytic metal precursor compound can be at a temperature of 200° C. to 800° C. for 0.5 hours to 24 hours, depending on the nature of the impregnated catalytic metal compound. Depending on the precursor for the catalytic metal, the drying step(s) and/or the decomposing calcination step(s) can be optional. Examples of additional catalytic metals can include, but are not limited to, Ni, Co, Fe, Pd, Rh, Ru, Pt, Ir, Cu, Ag, Au, Zr, Cr, Ti, V, and combinations thereof.

Alternative embodiments may use reactor media other than monoliths, such as whereby the channel conduits/flow paths may include a more tortuous pathways (e.g. convoluted, complex, winding and/or twisted but not linear or tubular), including but not limited to labyrinthine, variegated flow paths, conduits, tubes, slots, and/or a pore structure having channels through a portion(s) of the reactor. Such other types of reactor media can be suitable, so long as at least a portion of such media can be formed by sintering a ceramic catalytic composition as described herein, followed by exposing such media to reducing conditions to activate the catalyst. For such embodiments, the complex flow path may create a lengthened effective flow path, increased surface area, and improved heat transfer. Such design may be preferred for reactor embodiments having a relatively short axial length through the reactor. Axially longer reactor lengths may experience increased pressure drops through the reactor. However for such embodiments, the porous and/or permeable media may include, for example, at least one of a packed bed, an arrangement of tiles, a permeable solid media, a substantially honeycomb-type structure, a fibrous arrangement, and a mesh-type lattice structure.

Referring again briefly to FIG. 6, the reactor system can include a first reactor 7 containing a first end 9 and a second end 11, and a second reactor 1 containing a primary end 3 and a secondary end 5. The embodiment illustrated in FIG. 6 is an illustration provided for explanatory purposes only and are not intended to represent a comprehensive embodiment. Reference made to an "end" of a reactor merely refers to a distal portion of the reactor with respect to an axial mid-point of the reactor. Thus, to say that a gas enters or exits an "end" of the reactor, such as end 9, means merely that the gas may enter or exit substantially at any of the various points along an axis between the respective end face of the reactor and a mid-point of the reactor, but more preferably closer to the end face than to the mid-point. Thereby, one or both of the first and second reactant gases could enter at the respective end face, while the other is supplied to that respective end of the reactor through slots or ports in the circumferential or perimeter outer surface on the respective end of the reactor.

CONFIGURATION EXAMPLES

Reforming and Steam Generation

FIG. 1 shows an example of a reaction system suitable for integrating carbon capture with hydrocarbon reforming in a reaction system including reverse flow reactors. In the example shown in FIG. 1, the reaction system includes multiple reverse flow reactors. Although a total of five reactors are shown in FIG. 1, it is understood that any convenient number of reactors can be used. By using multiple reactors, a continuous or substantially continuous stream of reaction product can be provided as input to downstream parts of a refinery, chemical plant, or other facility.

In FIG. 1, reactor 110 corresponds to a reactor in the regeneration portion of the reaction cycle. Reactor 120 corresponds to a reactor in the oxygen storage portion of the reaction cycle. Reactor(s) 130 correspond to reactors in the endothermic reaction (reforming) portion of the reaction cycle. For example, reactors 130 can be performing steam reforming, where an endothermic reagent stream or input stream 132 of steam and methane (and/or other reformable hydrocarbons) is converted to an endothermic reaction product stream or reforming effluent 135. Reactor 140 corresponds to a reactor that is in-between the regeneration and reaction portions of the cycle. Depending on the aspect, reactor 140 can correspond to a reactor that is about to enter the endothermic reaction, oxygen storage, or regeneration portion of the cycle. It is understood that the representation in FIG. 1 corresponds to a snapshot of the system at a given point in time. As the reaction cycle continues, the individual reactors will progress from reaction to regeneration and back again to reaction.

During regeneration, fuel and working fluid mixture 102 is passed into the reactors in the regeneration step, such as reactor(s) 110. The working fluid can be, for example, a recycled portion of flue gas. The fuel and working fluid mixture 102 can be pressurized to a desired pressure prior to being passed into reactor(s) 110. In the configuration shown in FIG. 1, a first portion 162 of the flue gas 115 from reactor(s) 110 is passed through a heat recovery stage, such as a waste heat boiler 160, followed by compression 163 to increase the recycled flue gas to the same pressure as fuel and oxidant feed mixture 102 prior to combining the flows. The remaining portion 165 of flue gas stream 115 is passed out of the reaction system, in order to maintain a desired level of gas within the reaction system. Optionally, the remaining portion can be further processed to form a high purity, high pressure $CO_2$ stream that is suitable for sequestration and/or for use as a reagent or process gas. For example, if the flue gas stream 115 is at a pressure of 10 MPa-a or more, the remaining portion can be passed into a separation stage to remove water while substantially maintaining the pressure of the remaining portion.

In FIG. 1, the flow path corresponding to flue gas 115; the first portion 162; and the line where first portion 162 is combined with fuel 102 corresponds to a recycle loop. The recycle loop provides fluid communication between the reactor inlet end of reactor(s) 110 and the regenerator inlet end of reactor(s) 110. The fluid communication is intermittent, as the fluid communication is only provided during the regeneration step. This can be managed, for example, by appropriate use of valves.

The fuel 102 can be combusted by exposing the fuel 102 to oxygen stored in the reactor during oxygen storage step. Any convenient type of hydrocarbon and/or hydrogen can be used as the fuel, such as methane or natural gas. Optionally, a portion of the fuel can correspond to a tail gas 157 derived from separating $H_2$ from remaining components in the reforming effluent.

During the oxygen storage step, air 122 (or another oxygen-containing stream) can be passed into reactor 120. In addition to storing oxygen in the reactor 120, this produces a depleted air stream 125 with an oxygen content that is lower than the oxygen content of air 122. For example, the oxygen content of air 122 can be roughly 21 vol %, while the oxygen content of depleted air stream 125 can be 15 vol %. The depleted air 125 can then optionally be used as an oxygen source for a process that can operate with the depleted air. For example, the depleted air can be used as an oxygen source 185 for a gas powered turbine 180. Still further integration with a turbine can be achieved by using a working fluid 182 from turbine 180 as the air 122 for reactor 120. The depleted air 125 can then be used as the oxygen source for turbine 180.

In the configuration shown in FIG. 1, after exiting from the reactor(s) 130, the reforming effluent 135 is passed into a water gas shift reactor 140 to produce a shifted synthesis gas product 145. Water gas shift reactor 140 can be used to increase the molar ratio of $H_2$ to CO in the shifted synthesis gas product 145. The $H_2$ to CO molar ratio in the reforming effluent 135 is typically near 3:1. In some aspects, water gas shift reactor 140 can be used to create a shifted synthesis gas product 145 with a reduced or minimized CO content, such as having a CO content of 5.0 vol % or less, or 3.0 vol % or less, or 1.5 vol % or less, such as down to having substantially no CO content (0.1 vol % or less). This can correspond to having an $H_2$ to CO ratio of 8:1 or more, or 10:1 or more. In other aspects, a smaller amount of CO reduction can be performed. In such aspects, the ratio of $H_2$ to CO in the shifted synthesis gas product can be between 4.0 and 10, or between 4.0 and 8.0. This can increase the fuel value of the tail gas stream 157 that is used as part of the fuel for regenerating reactor(s) 110.

The shifted synthesis gas product 145 can then be separated using one or more swing adsorption reactors 150 to produce a hydrogen-enriched stream 155 and tail gas 157.

Figure 2:
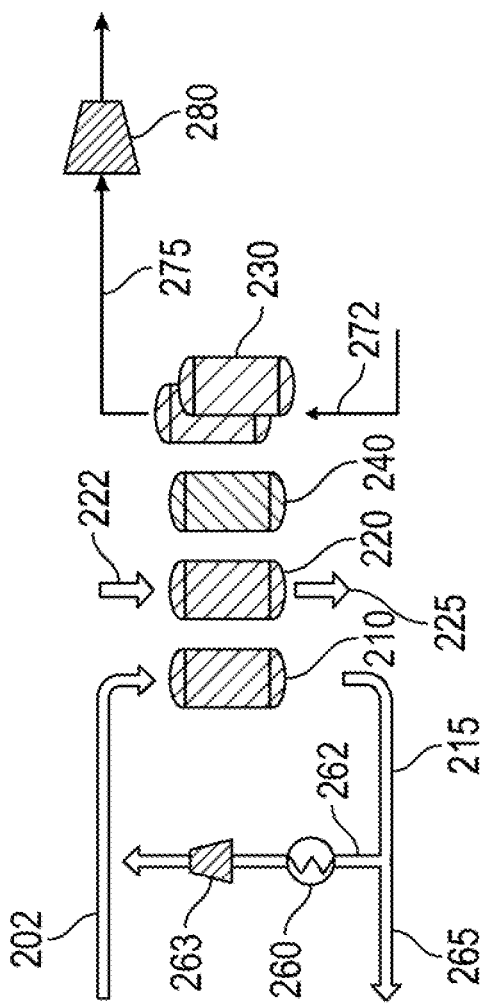
FIG. 2 shows another example of a configuration for using oxycombustion to provide heat for a reverse flow reactor.

FIG. 2 shows another example of a configuration where oxycombustion is used to provide heat during regeneration. In the example shown in FIG. 2, the endothermic "reaction" step corresponds to generation of steam. Thus, for the configuration shown in FIG. 2, the endothermic reagent stream for the endothermic process is water or steam at a first temperature, and the endothermic product stream is steam at a higher temperature than the water or steam in the input flow. It is noted that the endothermic product is not a reaction product, but may involve a phase change relative to the endothermic reagent stream. The configuration in FIG. 2 provides a variety of advantages. By using oxycombustion to provide heat to the reactor, steam can be generated while also generating a high purity, high concentration $CO_2$ stream from the combustion used to generate the steam. Additionally, the high purity, high concentration $CO_2$ stream can be generated without requiring the use of an air separation unit. This avoids the substantial operating costs associated with air separation.

In FIG. 2, reactor 210 corresponds to a reactor in the regeneration portion of the reaction cycle. Reactor 220 corresponds to a reactor in the oxygen storage portion of the reaction cycle. Reactor(s) 230 correspond to reactors in the endothermic reaction (steam generation) portion of the reaction cycle. Reactor 240 corresponds to a reactor that is in-between the regeneration and reaction portions of the cycle. Depending on the aspect, reactor 240 can correspond to a reactor that is about to enter the endothermic reaction, oxygen storage, or regeneration portion of the cycle. It is understood that the representation in FIG. 2 corresponds to a snapshot of the system at a given point in time. As the reaction cycle continues, the individual reactors will progress from reaction to regeneration and back again to reaction.

During regeneration, fuel and working fluid mixture 202 is passed into the reactors in the regeneration step, such as reactor(s) 210. The working fluid can be, for example, a recycled portion of flue gas. The fuel and working fluid mixture 202 can be pressurized to a desired pressure prior to being passed into reactor(s) 210. In the configuration shown in FIG. 2, a first portion 262 of the flue gas 215 from reactor(s) 210 is passed through a heat recovery stage, such as a waste heat boiler 260, followed by compression 263 to increase the recycled flue gas to the same pressure as fuel and oxidant feed mixture 202 prior to combining the flows. The remaining portion 265 of flue gas stream 215 is passed out of the reaction system, in order to maintain a desired level of gas within the reaction system. Optionally, the remaining portion can be further processed to form a high purity, high pressure $CO_2$ stream that is suitable for sequestration and/or for use as a reagent or process gas. For example, if the flue gas stream 215 is at a pressure of 10 MPa-a or more, the remaining portion can be passed into a separation stage to remove water while substantially maintaining the pressure of the remaining portion.

The fuel 202 can be combusted by exposing the fuel 202 to oxygen stored in the reactor during oxygen storage step. Any convenient type of hydrocarbon and/or hydrogen can be used as the fuel, such as methane or natural gas.

During the oxygen storage step, air 222 (or another oxygen-containing stream) can be passed into reactor 220. In addition to storing oxygen in the reactor 220, this produces a depleted air stream 225 with an oxygen content that is lower than the oxygen content of air 222. For example, the oxygen content of air 222 can be roughly 21 vol %, while the oxygen content of depleted air stream 225 can be 15 vol %. The depleted air 225 can then optionally be used as an oxygen source for a process that can operate with the depleted air.

In the configuration shown in FIG. 2, water 272 is passed into reactor(s) 230. The water 272 can correspond to a liquid water feed, a gas stream that contains steam, or a combination thereof. Higher temperature steam is then created by heat transfer within reactor(s) 230. After exiting from the reactor(s) 230, the steam 275 can be used in any convenient manner. In the example shown in FIG. 2, the steam 275 is used for power generation by using the steam 275 to power turbine 280. In other aspects, steam can be used directly for heating, the steam can be used as a reagent, or the steam can be used for another conventional purpose.

Process Example

Reverse Flow Reforming and Regeneration

An example of a reaction that can be performed in a reverse flow reactor system is reforming of hydrocarbons under steam reforming conditions in the presence of $H_2O$, under dry reforming conditions in the presence of $CO_2$, or under conditions where both $H_2O$ and $CO_2$ are present in the reaction environment. As a general overview of operation during reforming in a swing reactor, such as a reverse flow reactor, a regeneration step or portion of a reaction cycle can be used to provide heat for the reactor. Reforming can then occur within the reactor during a reforming step or portion of the cycle, with the reforming reaction consuming heat provided during the reactor regeneration step.

Prior to the start of regeneration, an oxygen storage step can be performed. Air (or another oxygen-containing gas) can be passed into the reactor to allow the oxygen storage component to store oxygen for subsequent use in combustion of fuel.

During reactor regeneration, fuel and a working fluid are introduced into the reactor from a regeneration end of the reactor. The regeneration portion of the reactor can include an oxygen storage component that provides the oxidant for combusting the fuel. Depending on the aspect, some or all of the regeneration portion of the reactor can overlap with the endothermic reaction zone. For example, when the bound oxygen storage component is applied as a washcoat to a monolith or other surfaces in the reactor, the washcoat can include both the bound oxygen storage component and the endothermic catalyst (if any) that is used for the endothermic reaction. As the fuel is combusted in the regeneration section, heat is transferred from the regeneration section to the fuel and working fluid. The flow of the fuel and working fluid continues during the regeneration step, leading to additional transfer of the heat generated from combustion into the reforming end of the reactor.

After a sufficient period of time, the combustion reaction is stopped. Any remaining combustion products and/or reactants can optionally be purged. The reforming step or portion of the reaction cycle can then start. The reactants for reforming can be introduced into the reforming end of the reactor, and thus flow in effectively the opposite direction relative to the flow during regeneration. The bed and/or monoliths in the reforming portion of the reactor can include a catalyst for reforming. In various aspects, at least a portion of the catalyst can correspond to a catalyst formed from a ceramic composition as described herein. As reforming occurs, the heat introduced into the reforming zone during combustion can be consumed by the endothermic reforming reaction. After exiting the reforming zone, the reforming products (and unreacted reactants) are no longer exposed to a reforming catalyst. As the reforming products pass through the regeneration zone, heat can be transferred from the products to the regeneration zone. After a sufficient period of time, the reforming process can be stopped, remaining reforming products can optionally be collected or purged from the reactor, and the cycle can start again with a regeneration step.

The reforming reaction performed within the reactor can correspond reforming of methane and/or other hydrocarbons using steam reforming, in the presence of $H_2O$; using dry reforming, in the presence of $CO_2$, or using "bi" reforming in the presence of both $H_2O$ and $CO_2$. Examples of stoichiometry for steam, dry, and "bi" reforming of methane are shown in equations (1)-(3).

Dry Reforming: $CH_4 + CO_2 = 2CO + 2H_2$ (1)

Steam Reforming: $CH_4 + H_2O = CO + 3H_2$ (2)

Bi Reforming: $3CH_4 + 2H_2O + CO_2 = 4CO + 8H_2$. (3)

As shown in equations (1)-(3), dry reforming can produce lower ratios of $H_2$ to CO than steam reforming. Reforming reactions performed with only steam can generally produce a ratio of $H_2$ to CO of around 3, such as 2.5 to 3.5. By contrast, reforming reactions performed in the presence of $CO_2$ can generate much lower ratios, possibly approaching a ratio of $H_2$ to CO of roughly 1.0 or even lower. By using a combination of $CO_2$ and $H_2O$ during reforming, the reforming reaction can potentially be controlled to generate a wide variety of $H_2$ to CO ratios in a resulting syngas.

It is noted that the ratio of $H_2$ to CO in a synthesis gas can also be dependent on the water gas shift equilibrium. Although the above stoichiometry shows ratios of roughly 1 or roughly 3 for dry reforming and steam reforming, respectively, the equilibrium amounts of $H_2$ and CO in a synthesis gas can be different from the reaction stoichiometry. The equilibrium amounts can be determined based on the water gas shift equilibrium.

Most reforming catalysts, such as rhodium and/or nickel, can also serve as water gas shift catalysts. Thus, if reaction environment for producing $H_2$ and CO also includes $H_2O$ and/or $CO_2$, the initial stoichiometry from the reforming reaction may be altered based on the water gas shift equilibrium. This equilibrium is also temperature dependent, with higher temperatures favoring production of CO and $H_2O$. It is noted that higher temperatures can also improve the rate for reaching equilibrium. As a result, the ability to perform a reforming reaction at elevated temperatures can potentially provide several benefits. For example, instead of performing steam reforming in an environment with excess $H_2O$, $CO_2$ can be added to the reaction environment. This can allow for both a reduction in the ratio of $H_2$ to CO produced based on the dry reforming stoichiometry as well as a reduction in the ratio of $H_2$ to CO produced based on the water gas shift equilibrium. Alternatively, if a higher $H_2$ to CO ratio is desired, $CO_2$ can be removed from the environment, and the ratio of $H_2O$ to $CH_4$ (or other hydrocarbons) can be controlled to produce a desirable type of synthesis gas. This can potentially allow for generation of a synthesis gas having a $H_2$ to CO ratio of 0.1 to 15, or 0.1 to 3.0, or 0.5 to 5.0, or 1.0 to 10, by selecting appropriate amounts of feed components.

The reforming reactions shown in equations (1)-(3) are endothermic reactions. One of the challenges in commercial scale reforming can be providing the heat for performing the reforming reaction in an efficient manner while reducing or minimizing introduction of additional components into the desired synthesis gas product. Cyclic reaction systems, such as reverse flow reactor systems, can provide heat in a desirable manner by having a cycle including a reforming step and a regeneration step. During the regeneration step, combustion can be performed within a selected area of the reactor. A gas flow during regeneration can assist with transferring this heat from the combustion zone toward additional portions of the reforming zone in the reactor. The reforming step within the cycle can be a separate step, so that incorporation of products from combustion into the reactants and/or products from reforming can be reduced or minimized. The reforming step can consume heat, which can reduce the temperature of the reforming zone. As the products from reforming pass through the reactor, the reforming products can pass through a second zone that lacks a reforming or water gas shift catalyst. This can allow the reaction products to cool prior to exiting the reactor. The heat transferred from the reforming products to the reactor can then be used to increase the temperature of the reactants for the next combustion or regeneration step.

One common source for methane is natural gas. In some applications, natural gas, including associated hydrocarbon and impurity gases, may be used as a feed for the reforming reaction. The supplied natural gas also may be sweetened and/or dehydrated natural gas. Natural gas commonly includes various concentrations of associated gases, such as ethane and other alkanes, preferably in lesser concentrations than methane. The supplied natural gas may include impurities, such as $H_2S$ and nitrogen. More generally, the hydrocarbon feed for reforming can include any convenient combination of methane and/or other hydrocarbons. Optionally, the reforming feed may also include some hydrocarbonaceous compounds, such as alcohols or mercaptans, which are similar to hydrocarbons but include one or more heteroatoms different from carbon and hydrogen. In some aspects, an additional component present in the feed can correspond to impurities such as sulfur that can adsorb to the catalytic monolith during a reducing cycle (such as a reforming cycle). Such impurities can be oxidized in a subsequent cycle to form sulfur oxide, which can then be reduced to release additional sulfur-containing components (or other impurity-containing components) into the reaction environment.

In some aspects, the feed for reforming can include, relative to a total weight of hydrocarbons in the feed for reforming, 5 wt % or more of $C_{2+}$ compounds, such as ethane or propane, or 10 wt % or more, or 15 wt % or more, or 20 wt % or more, such as up to 50 wt % or possibly still higher. It is noted that nitrogen and/or other gases that are non-reactive in a combustion environment, such as $H_2O$ and $CO_2$, may also be present in the feed for reforming. In aspects where the reformer corresponds to an on-board reforming environment, such non-reactive products can optionally be introduced into the feed, for example, based on recycle of an exhaust gas into the reformer. Additionally or alternatively, the feed for reforming can include 40 wt % or more methane, or 60 wt % or more, or 80 wt % or more, or 95 wt % or more, such as having a feed that is substantially composed of methane (98 wt % or more). In aspects where the reforming corresponds to steam reforming, a molar ratio of steam molecules to carbon atoms in the feed can be 0.3 to 4.0. It is noted that methane has 1 carbon atom per molecule while ethane has 2 carbon atoms per molecule. In aspects where the reforming corresponds to dry reforming, a molar ratio of $CO_2$ molecules to carbon atoms in the feed can be 0.05 to 3.0.

Within the reforming zone of a reverse flow reactor, the temperature can vary across the zone due to the nature of how heat is added to the reactor and/or due to the kinetics of the reforming reaction. The highest temperature portion of the zone can typically be found near a middle portion of the reactor. This middle portion can be referred to as a mixing zone where combustion is initiated during regeneration. At least a portion of the mixing zone can correspond to part of the reforming zone if a monolith with reforming catalyst extends into the mixing zone. As a result, the location where combustion is started during regeneration can typically be near to the end of the reforming zone within the reactor. It is noted that the location of combustion catalyst within the reactor(s) can overlap with the location of reforming catalyst within the reactor(s), so that some portions of the reactor(s) can correspond to both combustion zone and reaction zone. Moving from the center of the reactor to the ends of the reactor, the temperature can decrease. As a result, the temperature at the beginning of the reforming zone (at the end of the reactor) can be cooler than the temperature at the end of the reforming zone (in the middle portion of the reactor).

As the reforming reaction occurs, the temperature within the reforming zone can be reduced. The rate of reduction in temperature can be related to the kinetic factors of the amount of available hydrocarbons for reforming and/or the temperature at a given location within the reforming zone. As the reforming feed moves through the reforming zone, the reactants in the feed can be consumed, which can reduce the amount of reforming that occurs at downstream locations. However, the increase in the temperature of the reforming zone as the reactants move across the reforming zone can lead to an increased reaction rate.

At roughly 500° C., the reaction rate for reforming can be sufficiently reduced that little or no additional reforming will occur. As a result, in some aspects as the reforming reaction progresses, the beginning portion of the reforming zone can cool sufficiently to effectively stop the reforming reaction within a portion of the reforming zone. This can move the location within the reactor where reforming begins to a location that is further downstream relative to the beginning of the reforming zone. When a sufficient portion of the reforming zone has a temperature below 500° C., or below 600° C., the reforming step within the reaction cycle can be stopped to allow for regeneration. Alternatively, based on the amount of heat introduced into the reactor during regeneration, the reforming portion of the reaction cycle can be stopped based on an amount of reaction time, so that the amount of heat consumed during reforming (plus heat lost to the environment) is roughly in balance with the amount of heat added during regeneration. After the reforming process is stopped, any remaining synthesis gas product still in the reactor can optionally be recovered prior to starting the regeneration step of the reaction cycle.

After optional recovery of synthesis gas, the oxygen storage step can be performed to replenish the oxygen in the oxygen storage component. The regeneration process can then be initiated. During regeneration, a fuel such as methane, natural gas, or $H_2$ can be introduced into the reactor and combusted. The location where the fuel is combusted can be controlled based on the location of the oxygen storage component within the reactor. For example the oxygen storage component can be located in a middle portion of the reactor. This can also result in a temperature peak in a middle portion of the reactor. The temperature peak can be located within a portion of the reactor that also includes the reforming catalyst. During a regeneration cycle, the temperature within the reforming reactor can be increased sufficiently to allow for the reforming during the reforming portion of the cycle. This can result in a peak temperature within the reactor of 800° C. or more, or 1000° C. or more, or 1200° C. or more, or potentially a still higher temperature.

The relative length of time and reactant flow rates for the reforming and regeneration portions of the process cycle can be selected to balance the heat provided during regeneration with the heat consumed during reforming. For example, one option can be to select a reforming step that has a similar length to the regeneration step. Based on the flow rate of hydrocarbons, $H_2O$, and/or $CO_2$ during the reforming step, an endothermic heat demand for the reforming reaction can be determined. This heat demand can then be used to calculate a flow rate for combustion reactants during the regeneration step. Optionally, a portion of the heat can also be provided based on the heat generated during the exothermic oxygen storage step prior to performing the regeneration step. Of course, in other aspects the balance of heat between reforming and regeneration can be determined in other manners, such as by determining desired flow rates for the reactants and then selecting cycle lengths so that the heat provided by regeneration balances with the heat consumed during reforming.

In addition to providing heat, the oxygen storage step during a reaction cycle can also allow for coke removal from the catalyst within the reforming zone. In various aspects, one or more types of catalyst regeneration can potentially occur during the regeneration step. One type of catalyst regeneration can correspond to removal of coke from the catalyst. During reforming, a portion of the hydrocarbons introduced into the reforming zone can form coke instead of forming CO or $CO_2$. This coke can potentially block access to the catalytic sites (such as metal sites) of the catalyst. In some aspects, the rate of formation can be increased in portions of the reforming zone that are exposed to higher temperatures, such as portions of the reforming zone that are exposed to temperatures of 800° C. or more, or 900° C. or more, or 1000° C. or more. During an oxygen storage step, oxygen from the oxygen-containing stream can be present as the temperature of the reforming zone is increased due to the exothermic nature of the oxygen storage process. This can allow at least a portion of the coke generated during reforming to be removed as CO or $CO_2$.

Due to the variation in temperature across the reactor, several options can be used for characterizing the temperature within the reactor and/or within the reforming zone of the reactor. One option for characterizing the temperature can be based on an average bed or average monolith temperature within the reforming zone. In practical settings, determining a temperature within a reactor requires the presence of a measurement device, such as a thermocouple. Rather than attempting to measure temperatures within the reforming zone, an average (bed or monolith) temperature within the reforming zone can be defined based on an average of the temperature at the beginning of the reforming zone and a temperature at the end of the reforming zone. Another option can be to characterize the peak temperature within the reforming zone after a regeneration step in the reaction cycle. Generally, the peak temperature can occur at or near the end of the reforming zone, and may be dependent on the location where combustion is initiated in the reactor. Still another option can be to characterize the difference in temperature at a given location within the reaction zone at different times within a reaction cycle. For example, a temperature difference can be determined between the temperature at the end of the regeneration step and the temperature at the end of the reforming step. Such a temperature difference can be characterized at the location of peak temperature within the reactor, at the entrance to the reforming zone, at the exit from the reforming zone, or at any other convenient location.

In various aspects, the reaction conditions for reforming hydrocarbons can include one or more of an average reforming zone temperature ranging from 400° C. to 1200° (or more); a peak temperature within the reforming zone of 800° C. to 1500° C.; a temperature difference at the location of peak temperature between the end of a regeneration step and the end of the subsequent reforming step of 25° C. or more, or 50° C. or more, or 100° C. or more, or 200° C. or more, such as up to 800° C. or possibly still higher; a temperature difference at the entrance to the reforming zone between the end of a regeneration step and the end of the subsequent reforming step of 25° C. or more, or 50° C. or more, or 100° C. or more, or 200° C. or more, such as up to 800° C. or possibly still higher; and/or a temperature difference at the exit from the reforming zone between the end of a regeneration step and the end of the subsequent reforming step of 25° C. or more, or 50° C. or more, or 100° C. or more, or 200° C. or more, such as up to 800° C. or possibly still higher.

With regard to the average reforming zone temperature, in various aspects the average temperature for the reforming zone can be 500° C. to 1500° C., or 400° C. to 1200° C., or 800° C. to 1200° C., or 400° C. to 900° C., or 600° C. to 1100° C., or 500° C. to 1000° C. Additionally or alternatively, with regard to the peak temperature for the reforming zone (likely corresponding to a location in the reforming zone close to the location for combustion of regeneration reactants), the peak temperature can be 800° C. to 1500° C., or 1000° C. to 1400° C., or 1200° C. to 1500° C., or 1200° C. to 1400° C.

Additionally or alternatively, the reaction conditions for reforming hydrocarbons can include a pressure of 0 psig to 1500 psig (10.3 MPa), or 0 psig to 1000 psig (6.9 MPa), or 0 psig to 550 psig (3.8 MPa); and a gas hourly space velocity of reforming reactants of 1000 hr$^{-1}$ to 50,000 hr$^{-1}$. The space velocity corresponds to the volume of reactants relative to the volume of monolith per unit time. The volume of the monolith is defined as the volume of the monolith as if it was a solid cylinder.

In some aspects, an advantage of operating the reforming reaction at elevated temperature can be the ability to convert substantially all of the methane and/or other hydrocarbons in a reforming feed. For example, for a reforming process where water is present in the reforming reaction environment (i.e., steam reforming or bi-reforming), the reaction conditions can be suitable for conversion of 10 wt % to 100 wt % of the methane in the reforming feed, or 20 wt % to 80 wt %, or 50 wt % to 100 wt %, or 80 wt % to 100 wt %, or 10 wt % to 98 wt %, or 50 wt % to 98 wt %. Additionally or alternatively, the reaction conditions can be suitable for conversion of 10 wt % to 100 wt % of the hydrocarbons in the reforming feed, or 20 wt % to 80 wt %, or 50 wt % to 100 wt %, or 80 wt % to 100 wt %, or 10 wt % to 98 wt %, or 50 wt % to 98 wt %

In other aspects, for a reforming process where carbon dioxide is present in the reforming reaction environment (i.e., dry reforming or bi-reforming), the reaction conditions can be suitable for conversion of 10 wt % to 100 wt % of the methane in the reforming feed, or 20 wt % to 80 wt %, or 50 wt % to 100 wt %, or 80 wt % to 100 wt %, or 10 wt % to 98 wt %, or 50 wt % to 98 wt %. Additionally or alternatively, the reaction conditions can be suitable for conversion of 10 wt % to 100 wt % of the hydrocarbons in the reforming feed, or 20 wt % to 80 wt %, or 50 wt % to 100 wt %, or 80 wt % to 100 wt %, or 10 wt % to 98 wt %, or 50 wt % to 98 wt %.

In some alternative aspects, the reforming reaction can be performed under dry reforming conditions, where the reforming is performed with $CO_2$ as a reagent but with a reduced or minimized amount of $H_2O$ in the reaction environment. In such alternative aspects, a goal of the reforming reaction can be to produce a synthesis gas with a $H_2$ to CO ratio of 1.0 or less. In some aspects, the temperature during reforming can correspond to the temperature ranges described for steam reforming. Optionally, in some aspects a dry reforming reaction can be performed at a lower temperature of between 500° C. to 700° C., or 500° C. to 600° C. In such aspects, the ratio of $H_2$ to CO can be 0.3 to 1.0, or 0.3 to 0.7, or 0.5 to 1.0. Performing the dry reforming reaction under these conditions can also lead to substantial coke production, which can require removal during regeneration in order to maintain catalytic activity.

Processing of Reforming Effluent—Water Gas Shift and Swing Adsorption

In some aspects, one of the modifications to the fuel mixture for the regeneration step can be to modify the fuel by adding a tail gas from separation of the products from the endothermic reaction, such as a tail gas from separation of $H_2$ from a hydrocarbon reforming effluent. In such aspects, the processing and separation of the reforming effluent can also be modified to provide a tail gas with an increased CO content.

Although hydrogen is often the desired output from hydrocarbon reforming, the nature of a hydrocarbon reforming reaction also results in production of carbon oxides. The carbon oxides are typically a mixture of CO and $CO_2$, with the ratio of CO to $CO_2$ being at least partially selected by subsequently exposing the reforming effluent to a water gas shift catalyst under appropriate conditions. When hydrogen is the desired output from reforming, the effluent is typically shifted to increase or maximize $H_2$ production. This also results in increased $CO_2$ production. A separation is then performed to provide a high purity $H_2$ stream and one or more remaining portions that include the $CO_2$. Because the $CO_2$ from the combustion product is dilute, it is generally not desirable to combine the additional $CO_2$ from reforming with the combustion product. Any convenient type of separation that is suitable for separating $H_2$ from carbon oxides and water can be used. Pressure swing adsorption is an example of a separation method that can separate $H_2$ from carbon oxides and water.

In contrast to conventional methods, in various aspects the carbon oxides from the reforming effluent can be added to the input flows for regeneration as part of a tail gas that is added to the fuel. The tail gas can be formed, for example, by separating hydrogen from the reforming effluent using swing adsorption, such as pressure swing adsorption.

After reforming, the reforming effluent can first be exposed to a water gas shift catalyst in order to modify the ratio of $H_2$ to CO in the reforming effluent. The water gas shift reaction is a fast equilibrium reaction. The stoichiometry of the water gas shift reaction is shown in Equation (4).

$$H_2O + CO \Longleftrightarrow H_2 + CO_2 \qquad (4)$$

Generally, the water gas shift reaction can be performed at temperatures of 250° C. or more. A variety of catalysts are available that provide water gas shift reaction activity. Catalysts with reforming activity, such as nickel or rhodium based catalysts, typically also have activity for the water gas shift reaction. Other transition metals such as iron and copper can also have activity for the water gas shift reaction.

During conventional $H_2$ production, the conditions for the water gas shift reaction are typically selected to reduce the CO concentration in the reforming effluent by roughly 90%. For example, by including excess steam during reforming and/or using excess steam when exposing the reforming effluent to a water gas shift catalyst, the equilibrium can be driven toward production of $H_2$ and $CO_2$ at the expense of CO. This is typically done to maximize the amount of $H_2$ in the reforming effluent. In some aspects, such conventional water gas shift reaction conditions can be used to increase the $H_2$ content of the reforming effluent to form a shifted synthesis gas product. In such aspects, the shifted synthesis gas product can include a CO content of 5.0 vol % or less, or 3.0 vol % or less, or 1.5 vol % or less, such as down to having substantially no CO content (0.1 vol % or less). This can correspond to having an $H_2$ to CO ratio of 8:1 or more, or 10:1 or more.

In other aspects, a water gas shift reaction prior to pressure swing adsorption can be operated to reduce the concentration of CO in the shifted synthesis gas product by 40% to 80%, or 50% to 80%, or 50% to 70%. In such aspects, the CO remaining in the shifted synthesis gas product after water gas shift can be separated with $CO_2$ during swing adsorption. While this does not substantially change the net amount of carbon in the tail gas after swing adsorption, it does increase the fuel value by including a larger amount of CO. The increased amount of CO in the tail gas can allow the amount of other fuel used in the regeneration step to be reduced by a corresponding amount. In such aspects, the ratio of $H_2$ to CO in the shifted synthesis gas product can be between 4.0 and 10, or between 4.0 and 8.0.

Pressure swing adsorption (PSA) relies on swinging or cycling pressure over a bed of adsorbent through a range of values. In PSA processes, a gaseous mixture is conducted under pressure for a period of time over a first bed of a solid sorbent that is selective, or relatively selective, for one or more components, usually regarded as a contaminant, to be removed from the gaseous mixture. For example, a feed can be introduced into a PSA apparatus at a feed pressure. At the feed pressure, one or more of the components (gases) in the feed can be selectively (or relatively selectively) (ad)sorbed, while one or more other components (gases) can pass through with lower or minimal adsorption. A component (gas) that is selectively (ad)sorbed can be referred to as a "heavy" component of a feed, while a gas that is not selectively (ad)sorbed can be referred to as a "light" component of a feed. For convenience, a reference to the "heavy" component of the feed can refer to all components (gases) that are selectively (ad)sorbed, unless otherwise specified. Similarly, a reference to the "light" component can refer to all components (gases) that are not selectively (ad)sorbed, unless otherwise specified. After a period of time, the feed flow into the PSA apparatus can be stopped. The feed flow can be stopped based on a predetermined schedule, based on detection of breakthrough of one or more heavy components, based on (ad)sorption of the heavy component(s) corresponding to at least a threshold percentage of the total capacity of the (ad)sorbent, or based on any other convenient criteria. The pressure in the reactor can then be reduced to a desorption pressure that can allow the selectively (ad)sorbed component(s) (gas(es)) to be released from the (ad)sorbent. Optionally, one or more purge gases, e.g. steam, can be used prior to, during, and/or after the reduction in pressure to facilitate release of the selectively (ad)sorbed component(s) (gas(es)). Depending on its nature, a full PSA cycle can optionally be performed at a roughly constant temperature. As PSA is usually enabled by at least adsorption and usually occurs on gaseous components, the terms "adsorption"/"adsorbent" and "gas(es)" are used as descriptors in the instant specification and claims, without intending to be limiting in scope, even though "absorption"/"absorbent"/"sorbent"/"sorption" and "component(s)" may be more generally applicable.

In various aspects, a reforming effluent can be used as the input flow for a pressure swing adsorption process. The synthesis gas can include $H_2$, $H_2O$, CO, and $CO_2$. In such aspects, $H_2O$, CO, and $CO_2$ can correspond to heavy components while $H_2$ can correspond to the light component. This can be achieved using commercially available adsorbents in the swing adsorber, such as adsorbents available from Air Products and Chemicals of Allentown, Pa. The light component ($H_2$) can pass through the adsorber as a primary product stream. The adsorbed components can be desorbed using a pressure swing process to form a tail gas containing the previously adsorbed components. Depending on the aspect, some $H_2$ can be used as part of the sweep gas during desorption to prepare the adsorbent for the next adsorption cycle. Optionally, if additional removal of CO and/or $CO_2$ is desired, supplemental adsorption of CO and/or $CO_2$ can be performed before and/or after the pressure swing adsorption. Any components removed by supplemental adsorption can optionally be added to the tail gas from the swing adsorption process.

A full pressure swing adsorption cycle involves, at a minimum, an adsorption stage (for adsorbing one or more components from an input flow) and a desorption stage (to regenerated the adsorbent by removing the adsorbed components). In order to provide a continuous or semi-continuous output flow, a plurality of adsorbent beds can be used. The multiple beds can be used to enable a complete cycle, where typically every bed sequentially goes through the same cycle. When a first PSA reactor satisfies a condition, such as the adsorbent in the reactor becoming sufficiently saturated, the feed flow can be switched to a second reactor. The first PSA reactor can then be regenerated by having the adsorbed gases released. To allow for a continuous feed flow, a sufficient number of PSA reactors and/or adsorbent beds can be used so that the first PSA reactor is finished regenerating prior to at least one other PSA reactor satisfying the condition for switching reactors.

To perform a separation, at least a portion of the reforming effluent can be introduced into a PSA reactor. To facilitate adsorption of the heavy components, the reforming effluent can be cooled prior to introducing the effluent into the PSA reactor. Depending on the amount of cooling performed, the reforming effluent can have a temperature from 10° C. to 150° C. as it enters the PSA reactor, or 10° C. to 100° C., or 20° C. to 150° C., or 20° C. to 100° C. The pressure of the reforming effluent as it enters the PSA reactor can be 10 bar-a (~1.0 MPa-a) to 60 bar-a (~6.0 MPa-a), or 15 bar-a (~1.5 MPa-a) to 50 bar-a (~5.0 MPa-a), or 20 bar-a (~2.0

MPa-a) to 60 bar-a (~5.0 MPa-a), or 10 bar-a (~1.0 MPa-a) to 40 bar-a (~4.0 MPa-a), or 10 bar-a (~1.0 MPa-a) to 30 bar-a (~3.0 MPa-a).

The feed can be passed through the PSA reactor until one or more pre-defined criteria is satisfied for switching the feed to another PSA reactor or otherwise stopping the flow of feed gas. Any convenient pre-defined criteria can be used. For example, the feed can be passed through the reactor for a specified time period. Additionally or alternately, the feed can be passed into the reactor until a breakthrough amount of CO, $CO_2$, and/or $H_2O$ is detected in the product $H_2$ stream. Further additionally or alternately, the feed can be passed into the reactor until the amount of $CO_2$ and/or $H_2O$ that has entered the reactor is approximately equal to a threshold value of the adsorbent capacity of the reactor. In such a situation, for example, the feed can be passed into the reactor until the amount of $H_2O$ and/or $CO_2$ that has entered the reactor is equal to 75% or more of the adsorbent capacity of the adsorbent material in the reactor, or 80% or more, or 85% or more, or 90% or more, such as up to 100% or possibly still higher. A typical PSA cycle can involve introducing feed into the reactor for about 30 seconds to about 300 seconds, e.g., for about 60 seconds to about 120 seconds.

One or more purge gas flows can be used to remove the adsorbed $CO_2$, $H_2O$, and CO from the reactor. One option can include using a hydrogen-containing purge to assist with desorbing the adsorbed components.

The adsorbent can be included in the pressure swing reactor in any convenient format. In some aspects, the adsorbent can correspond to particles of the adsorbent in a packed bed. In other aspects the adsorbent particles can be assembled into an ordered structure such as a monolith. Conventional monolith adsorbents have their own characteristic advantages and disadvantages, one of which is that it is difficult to form a thin and reliably uniform wash coating of adsorbent on the support, especially if the monolith has pores of relatively small diameter when the coating solution may clog the pore entrances and preclude further ingress of coating material. In this case, the adsorption characteristics of the monolith are likely to be unpredictable and less than optimal. To overcome this drawback, while retaining advantages of the monolith to a certain extent, including its low tortuosity and predictable void volume, particulate adsorbents can preferably be formed into a simulated monolith by laying down a layer of the adsorbent material on the surfaces of the particles and then assembling the particles into the adsorbent bed, e.g., either by packing directly into the sorption vessel in a densely packed bed or, more preferably, by forming the coated structured adsorbent particles into shaped structures which can then be packed into the vessel in the form of blocks, similarly to blocks of monolith. In effect, the conventional method of monolith fabrication can be inverted and the adsorbent coated onto the outside of the support particles and the monolith-like structure then assembled from the coated particles. In this way, not only can a more uniform coating of the essential adsorbent be achieved but the pore structure of the simulated monolith can be controlled by using particles of different shapes and surface roughness. When operating in this manner, the adsorbent particles should have a ratio of length to maximum cross-sectional dimension ratio of at least 2:1, preferably at least 5:1, and a maximum cross-sectional dimension typically not more than 5 mm, for example not more than 1 mm. After the particles are laid down in the ordered configuration with longitudinally extensive, substantially aligned gas channels, the particles can then be bundled/adhered together in the mass to form a coherent, self-supporting body. The masses can to then be placed in the vessel with the gas passages aligned in the desired orientation to form an ordered adsorbent bed. The void fraction within the adsorbent—that is, the ratio of the void volume due to porosity of solid adsorbents (including micropores and macropores) and also void volume due to gas flow channels or interstices to the volume of the vessel containing the adsorbent—should be less than 0.5, or less than 0.3.

Example 1

Heating of Reverse Flow Reactor Using Oxygen Storage Followed by Oxycombustion

Heating of a reverse flow reactor using oxygen storage followed by oxycombustion was demonstrated in a reverse flow reactor that included a monolith with an oxygen storage component applied to the monolith as a washcoat. In this example, 25 grams of manganese oxide was washcoated onto an alumina substrate with specifications: 100 cell per square inch (cpsi), 55% open frontal area (OFA), 2.35 inch diameter (D), and 6 inch length (L). The manganese coated substrate was stacked between two pieces of alumina substrate (uncoated) each with specification: 100 cpsi, 55% OFA, 2.35 in D, 3 inch L. The assembly was loaded into a vertically oriented reverse flow reactor. The reactor was 12 inches in length.

Cyclical flows were then introduced into the reactor to store oxygen and then perform oxygen combustion using the following procedure. An initial heating sequence was used to bring the temperature of the reactor vessel up to a typical operating temperature for a reverse flow reactor. The initial heating sequence was performed by first heating the vessel to roughly 300° C. by electric heaters. The vessel was then further heated to roughly 650° C. by flowing a mixture of heated air and hydrogen through the vessel. At this point, a sequence of flows was established, according to Table 1.

TABLE 1

Flows During Heating of Reactor via Oxycombustion

| Step | Gas | Flow Rate | Flow Direction | Step Duration |
|---|---|---|---|---|
| 1 | 50% $H_2$ + 50% $N_2$ | 20 sL/min | Down | 3 sec |
| 2 | $N_2$ | 80 sL/min | Up | 3 sec |
| 3 | Air | 50 sL/min | Down | 3 sec |
| 4 | $N_2$ | 10 sL/min | Down | 3 sec |

In Table 1, step 1 corresponds to the combustion step. The hydrogen in the gas flow of step 1 reacts with oxygen previously stored in the oxygen storage component to generate heat. The flow rate for the combustion step is relatively low at 20 standard liters per minute. Step 2 corresponds to nitrogen at a higher flow rate of 80 standard liters per minute. The nitrogen in step 2 is also introduced to flow up through the reactor, unlike the flows in the other steps which travel down through the reactor. The counter-current nature of step 2 can assist with providing a symmetric temperature profile with respect to the length of the reactor. Depending on the aspect, an asymmetric temperature profile may be desirable. Step 2 also purges any remaining $H_2$ from the reactor. Step 3 corresponds to the oxygen storage step. In step 3, 50 standard liters per minute of air are introduced into the reactor. This replenishes oxygen in the oxygen storage component. Step 4 corresponds to a nitrogen purge step, so that gas phase oxygen is not present within the reactor when step 1 of the next cycle begins.

Figure 7:
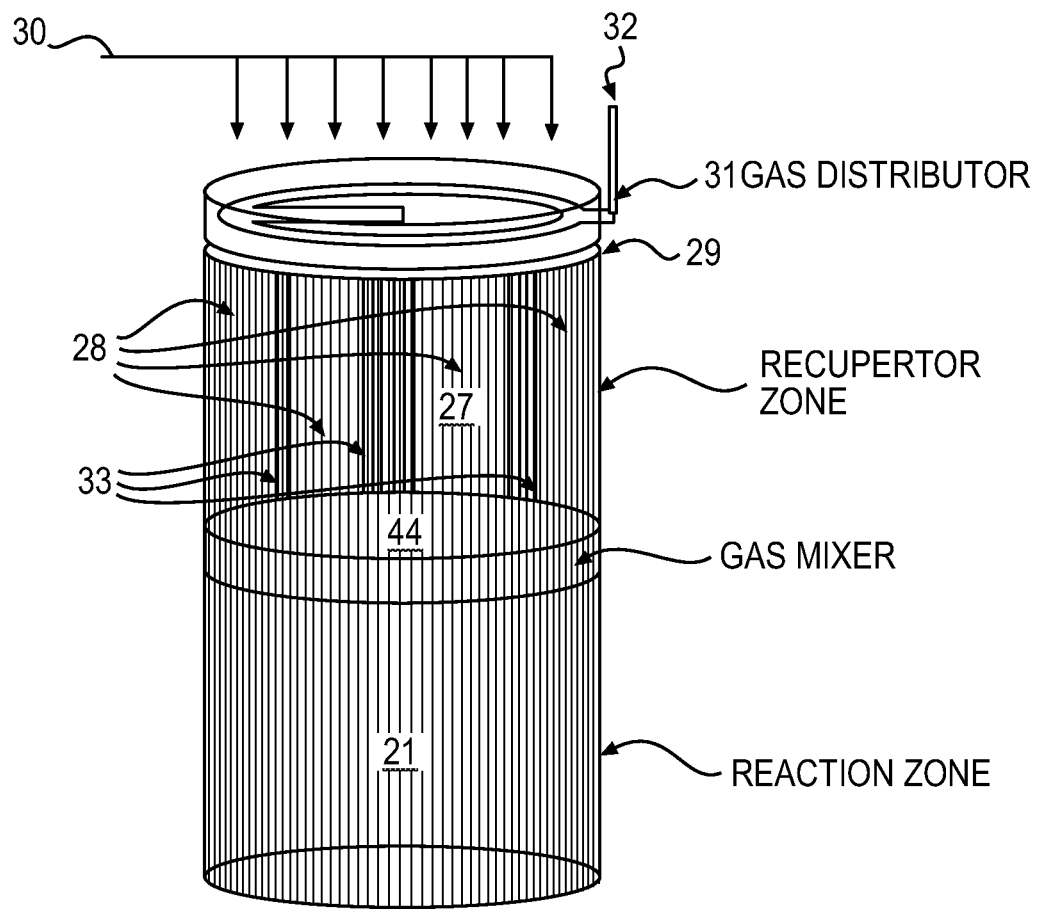
FIG. 7 shows a temperature profile for a reverse flow reactor heated at least partially by oxycombustion cycles.

After about two hours, the vessel reached the temperatures shown in FIG. 7. The data show that the heat was generated by the process, resulting from the combustion of hydrogen with oxygen stored on the manganese substrate.

It is noted that in the above example, the manganese oxide was added as a washcoat to the aluminum oxide surface without the use of a binder. Due to the relatively short nature of this test, the manganese oxide was effective for heating the monolith. However, after the 2 hour period, inspection of the monolith revealed that the manganese oxide had delaminated from the monolith surface. Thus, without the use of a suitable binder, the manganese oxide did not have sufficient structural stability to remain deposited on a surface.

Example 2

Regeneration Diluent Including 30% High Heat Capacity Gas

A pilot scale reactor (length of ~12 inches/~30 cm) was used to investigate the impact and benefits of modifying flue gas exit temperatures on operation of a reverse flow reactor system. The examples provided herein correspond to results from a single reactor, but those of skill in the art will readily understand the application of the following results to reaction systems including plurality of reverse flow reactors.

The pilot reactor was used to perform steam reforming in a reverse flow reactor using various types of diluent gases. The steam reforming was performed at a methane feed rate of 2 scf/min. The flow rate during the regeneration step was roughly 18 scf/min (~510 liters/min). This included roughly 16.1 scf/min (~455 liters/min) of diluent and 1.9 scf/min (~55 liters/min) of $H_2$ as a fuel. The pressure in the reactor for both the reaction step and the regeneration step was 150 psig (~1000 kPa-g).

Figure 4A:
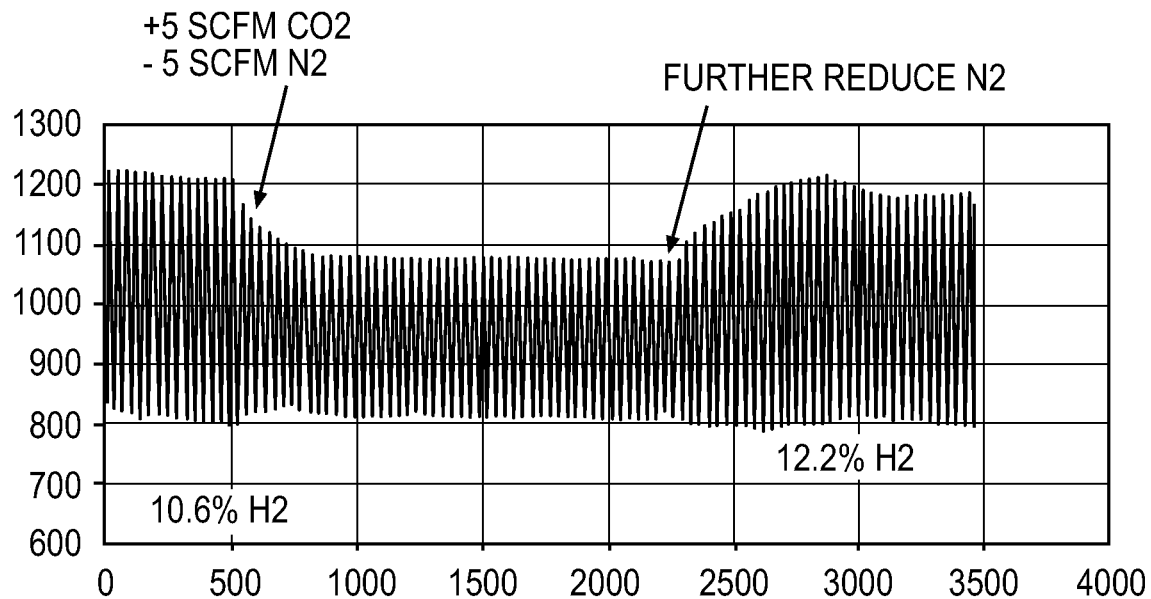
FIG. 4A shows how the composition of the fuel and diluent changed over time during the regeneration steps in the reactor.

FIG. 4A shows how the composition of the fuel and diluent changed over time during the regeneration steps in the reactor. Initially, 10.6 vol % of the flow into the reactor during regeneration corresponded to $H_2$ as a fuel. During the initial period, $N_2$ was used as substantially the entire diluent, although some smaller amounts of other gases typically present in air were included due to using air to provide the oxidant for the combustion reaction. These other gases corresponded to less than 15 vol % of the diluent.

Figure 4B:
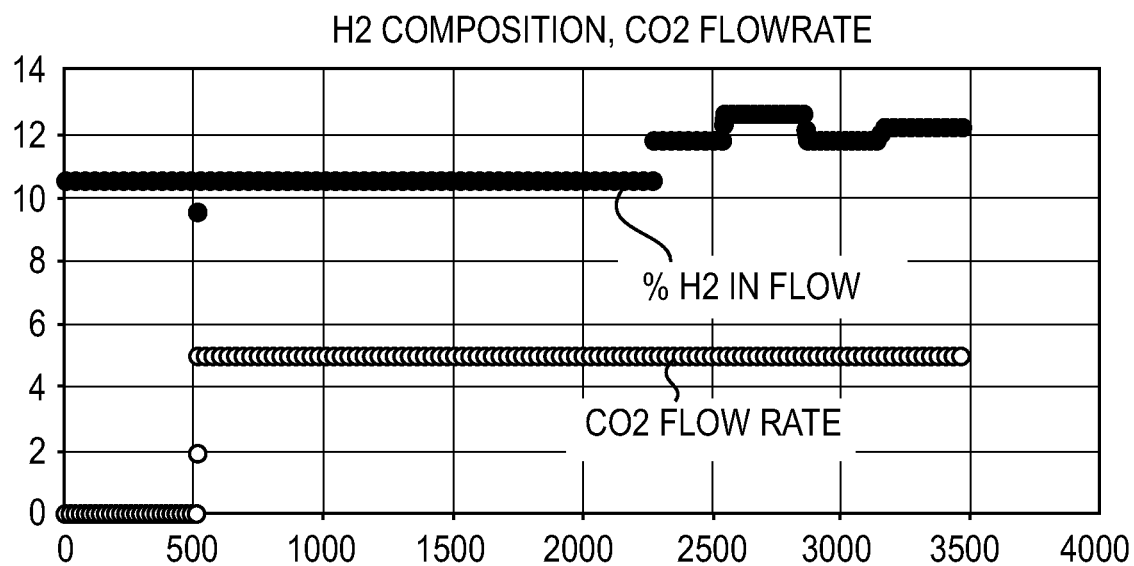
FIG. 4B shows the temperature at a location as a function of time.

In order to characterize the reactor, the temperature was sampled at 4 inches (~10 cm) from the end of the reactor where the regeneration gases enter. This location roughly corresponds to the location of the maximum in the temperature profile within the reactor. FIG. 4B shows the temperature at this location as a function of time. As shown in FIG. 4B, the temperature at the measured location reactor during the initial period was slightly greater than 1200° C. FIG. 4B also shows that the temperature cycled between a maximum of roughly 1220° C. at the end of the regeneration step and a minimum of roughly 800° C. at the end of the methane reforming step. This represents a temperature differential between the regeneration step and the reaction step of roughly 420° C.

After roughly 500 seconds of operation, FIG. 4A shows that 5.0 standard cubic feet per minute (~140 liters/min) of the $N_2$ diluent was replaced with 5.0 standard cubic feet per minute (~140 liters/min) of $CO_2$. This corresponded to replacing roughly 30 vol % of the diluent with $CO_2$. The temperature, pressure, and volume of the other input flows were kept the same. As shown in FIG. 4B, this resulted in a decrease of the maximum temperature from greater than 1200° C. to less than 1100° C. Next, fuel composition is increased to bring peak temperatures back up to greater than 1200 C. In this way, higher fuel compositions were used to create the same temperature profile within the reactor. This is achieved by reducing total diluent by roughly 15%. Although the regeneration volumetric flow during regeneration decreased, the amount of reforming performed during the reaction step remained substantially the same. This demonstrates that $CO_2$ can be used to replace $N_2$ as diluent to reduce regeneration volumetric flows within the reactor while still achieving similar reactivity. The reactor was operated under these conditions for roughly 2000 seconds to confirm that the reduced operating temperature could be maintained while also maintaining the same or a similar level of activity during the reaction step.

At 2500 seconds, additional $N_2$ was removed from the diluent. Instead of replacing the $N_2$ with other diluent, FIG. 4A shows that the amount of $H_2$ was increased from 10.6 vol % of the input flow to roughly 12.2 vol %. This increase in the amount of fuel represents a process intensification, as the additional heat generated during regeneration allowed additional reforming to be performed during the reaction step. As shown in FIG. 4B, this increased the maximum temperature in the reactor back to a temperature of slightly more than 1200° C. Thus, replacing roughly 10 vol % of the diluent during regeneration with $CO_2$ allowed for an increase in the amount of fuel used during regeneration of ~1.5 vol % (or an increase of ~15% relative to the starting amount), thus allowing for conversion of additional methane to $H_2$ during the reaction step.

Figure 5:
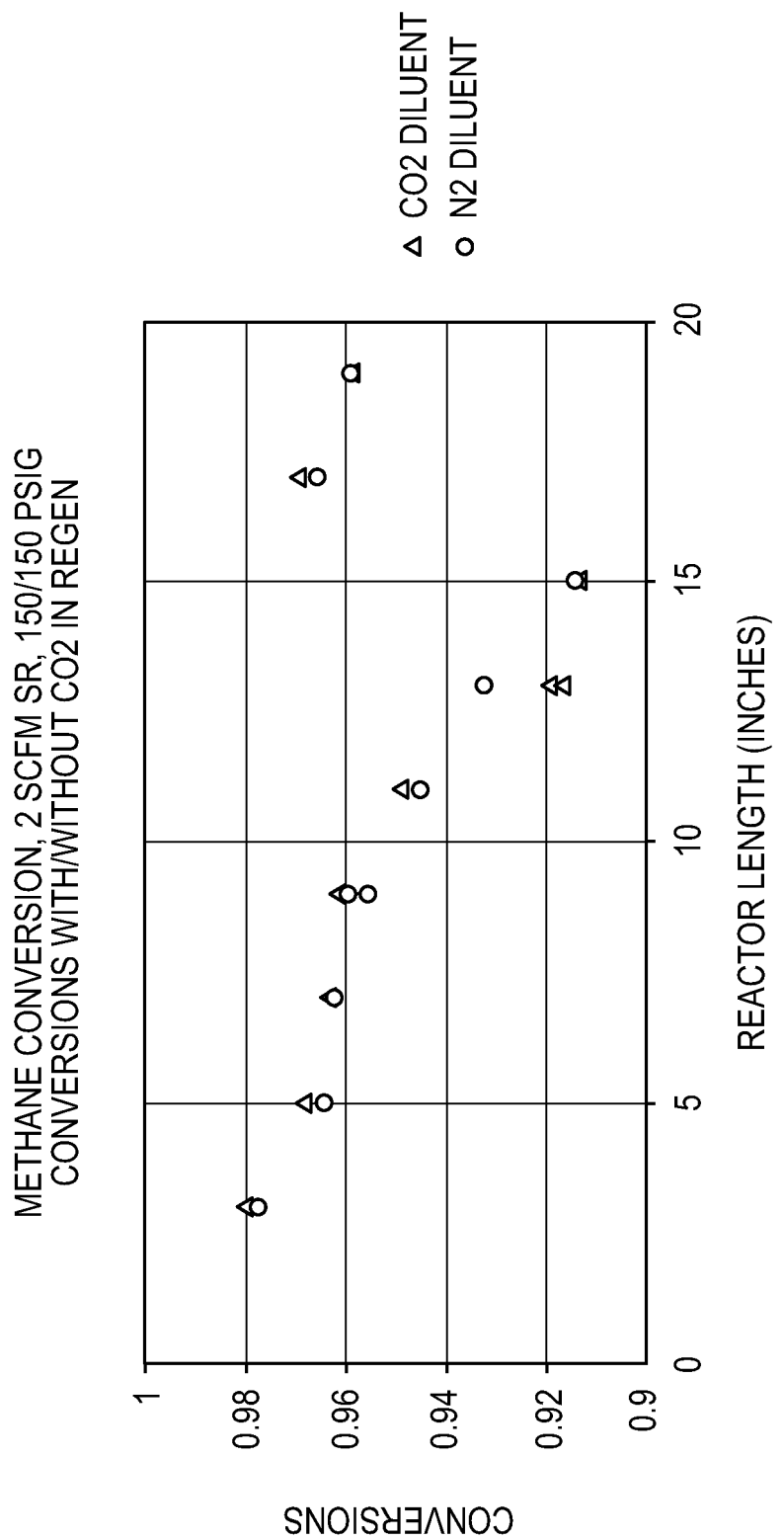
FIG. 5 shows methane conversion versus cycle time during steam reforming in a reverse flow reactor with different diluent gas compositions during regeneration.

FIG. 5 shows methane conversion versus cycle time for reforming performed under conditions similar to the conditions in FIG. 4A and FIG. 4B. As shown in FIG. 5, modifying the diluent to include 30 vol % $CO_2$ resulted in substantially the same conversion as operating the regeneration step with only $N_2$ as the diluent.

Additional Embodiments

Embodiment 1. A method for performing an endothermic reaction, comprising: exposing an oxygen-containing stream to an oxygen storage component in a combustion zone within a reactor to form an oxidized oxygen storage component, the reactor optionally comprising a reverse flow reactor, the oxygen storage component comprising: a metal oxide system comprising manganese oxide, iron oxide, copper oxide, nickel oxide, or a combination thereof, and a binder comprising magnesium oxide, calcium oxide, yttrium oxide or a combination thereof; reacting a fuel mixture comprising a fuel stream and a working fluid with the oxidized oxygen storage component under combustion conditions to form a flue gas and to heat one or more surfaces in a reaction zone to a regenerated surface temperature of 600° C. or more, the fuel mixture comprising 20 vol % or more $CO_2$; recycling at least a portion of the flue gas to form at least a portion of the working fluid; and exposing an endothermic reagent stream to the one or more surfaces in the reaction zone at the regenerated surface temperature to form an endothermic product stream, a direction of flow for the endothermic reagent stream within the reaction zone being reversed relative to a direction of flow for the fuel mixture.

Embodiment 2. The method of Embodiment 1, wherein the oxygen storage component comprises 20 wt % to 80 wt % of the binder, relative to a weight of the oxygen storage component.

Embodiment 3. The method of any of the above embodiments, wherein the endothermic reagent stream comprises $H_2O$ and the endothermic product stream comprises $H_2O$ at a higher temperature than a temperature of the endothermic reagent stream.

Embodiment 4. The method of any of the above embodiments, wherein the endothermic product stream comprises an endothermic reaction product stream.

Embodiment 5. The method of any of the above embodiments, wherein the one or more surfaces comprise a catalyst composition.

Embodiment 6. The method of any of the above embodiments, wherein at least a portion of the one or more surfaces are in the combustion zone.

Embodiment 7. The method of any of the above embodiments, wherein the endothermic reagent stream comprises a hydrocarbon, the endothermic product stream comprising a reforming effluent.

Embodiment 8. The method of Embodiment 7, further comprising: exposing the reforming effluent to water gas shift reaction conditions to form a shifted synthesis gas product stream; and separating the shifted synthesis gas product stream by pressure swing adsorption to form a $H_2$-containing stream and a stream comprising $CO_2$, the fuel mixture optionally comprising at least a portion of the stream comprising $CO_2$.

Embodiment 9. The method of any of the above embodiments, wherein recycling at least a portion of the flue gas to form at least a portion of the working fluid comprises separating the flue gas to form at least a $CO_2$-containing stream and the at least a portion of the working fluid.

Embodiment 10. The method of any of the above embodiments, wherein the combustion conditions comprise a combustion pressure of 0.5 MPa-g to 7.0 MPa-g, the oxygen storage conditions optionally comprising an oxygen storage pressure that differs from the combustion pressure by 3.0 MPa or less.

Embodiment 11. The method of any of the above embodiments, the method further comprising exposing the oxygen storage component to a supplemental oxygen-containing stream after the reacting of the fuel mixture and prior to the exposing of the one or more surfaces to the endothermic reagent.

Embodiment 12. The method of any of the above embodiments, wherein exposing the oxygen-containing stream to the oxygen storage component comprises exposing air to the oxygen storage component to form a depleted air stream, the method further comprising passing the depleted air stream into a combustion zone of a turbine, the depleted air stream optionally comprising 12 vol % to 16 vol % $O_2$.

Embodiment 13. The method of any of the above embodiments, wherein the working fluid comprises 25 vol % or more $CO_2$.

Embodiment 14. A reverse flow reactor system comprising: a reactor comprising a reactor inlet end, a regenerator inlet end, and a regeneration zone comprising an oxygen storage component, the oxygen storage component comprising: a metal oxide system comprising manganese oxide, iron oxide, copper oxide, nickel oxide, or a combination thereof, and a binder comprising magnesium oxide, calcium oxide, yttrium oxide or a combination thereof; and a recycle loop providing intermittent fluid communication between the reactor inlet end and the regenerator inlet, the recycle loop comprising a recycle compressor, a fuel source inlet, an oxygen-containing gas inlet, and a $CO_2$-containing gas outlet.

Embodiment 15. The reverse flow reactor system of Embodiment 14, wherein the oxygen storage component comprises 20 wt % to 80 wt % of the binder, relative to a weight of the oxygen storage component.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

The invention claimed is:

1. A method for performing an endothermic reaction, comprising:
   exposing an oxygen-containing stream to an oxygen storage component in a combustion zone within a reactor to form an oxidized oxygen storage component, the oxygen storage component comprising:
   a metal oxide system comprising manganese oxide, iron oxide, copper oxide, nickel oxide, or a combination thereof, and
   a binder comprising magnesium oxide, calcium oxide, yttrium oxide or a combination thereof;
   reacting a fuel mixture comprising a fuel stream and a working fluid with the oxidized oxygen storage component under combustion conditions to form a flue gas and to heat one or more surfaces in a reaction zone to a regenerated surface temperature of 600° C. or more, the fuel mixture comprising 20 vol % or more $CO_2$;
   recycling at least a portion of the flue gas to form at least a portion of the working fluid; and
   exposing an endothermic reagent stream to the one or more surfaces in the reaction zone at the regenerated surface temperature to form an endothermic product stream, a direction of flow for the endothermic reagent stream within the reaction zone being reversed relative to a direction of flow for the fuel mixture.

2. The method of claim 1, wherein the oxygen storage component comprises 20 wt % to 80 wt % of the binder, relative to a weight of the oxygen storage component.

3. The method of claim 1, wherein the endothermic reagent stream comprises $H_2O$ and the endothermic product stream comprises $H_2O$ at a higher temperature than a temperature of the endothermic reagent stream.

4. The method of claim 1, wherein the one or more surfaces comprise a catalyst composition.

5. The method of claim 1, wherein at least a portion of the one or more surfaces are in the combustion zone.

6. The method of claim 1, wherein the endothermic reagent stream comprises a hydrocarbon, the endothermic product stream comprising a reforming effluent.

7. The method of claim 6, further comprising:
   exposing the reforming effluent to water gas shift reaction conditions to form a shifted synthesis gas product stream; and
   separating the shifted synthesis gas product stream to form a $H_2$-containing stream and a stream comprising $CO_2$.

8. The method of claim 7, wherein the shifted synthesis gas product stream is separated by pressure swing adsorption, wherein the stream comprising $CO_2$ comprises a tail gas, and wherein the fuel mixture comprises at least a portion of the tail gas.

9. The method of claim 1, wherein recycling at least a portion of the flue gas to form at least a portion of the working fluid comprises separating the flue gas to form at least a $CO_2$-containing stream and the at least a portion of the working fluid.

10. The method of claim 1, further comprising compressing the at least a portion of the working fluid to the combustion pressure prior to the reacting.

11. The method of claim 1, wherein the combustion conditions comprise a combustion pressure of 0.5 MPa-g to 7.0 MPa-g.

12. The method of claim 11, wherein the oxygen storage conditions comprise an oxygen storage pressure that differs from the combustion pressure by 3.0 MPa or less.

13. The method of claim 1, the method further comprising exposing the oxygen storage component to a supplemental oxygen-containing stream after the reacting of the fuel mixture and prior to the exposing of the one or more surfaces to the endothermic reagent.

14. The method of claim 1, wherein exposing the oxygen-containing stream to the oxygen storage component comprises exposing air to the oxygen storage component to form a depleted air stream, the method further comprising passing the depleted air stream into a combustion zone of a turbine.

15. The method of claim 13, wherein the depleted air stream comprises 12 vol % to 16 vol % $O_2$.

16. The method of claim 1, wherein the working fluid comprises 25 vol % or more $CO_2$.

17. The method of claim 1, wherein the endothermic product stream comprises an endothermic reaction product stream.

18. The method of claim 1, wherein the reactor comprises a reverse flow reactor.

\* \* \* \* \*